(12) United States Patent
Wells et al.

(10) Patent No.: US 11,781,395 B2
(45) Date of Patent: Oct. 10, 2023

(54) SYSTEMS AND METHODS FOR IDENTIFYING BLOCKAGES IN SUBSEA CONDUITS

(71) Applicant: BP Corporation North America Inc., Houston, TX (US)

(72) Inventors: Shane Wells, Brookshire, TX (US); Ronald K. Berger, Houston, TX (US); James Longville, Westminster, CO (US)

(73) Assignee: BP Corporation North America Inc., Houston, TX (US)

( * ) Notice: Subject to any disclaimer, the term of this patent is extended or adjusted under 35 U.S.C. 154(b) by 195 days.

(21) Appl. No.: 16/935,611

(22) Filed: Jul. 22, 2020

(65) Prior Publication Data

US 2021/0025256 A1 Jan. 28, 2021

Related U.S. Application Data

(60) Provisional application No. 62/877,632, filed on Jul. 23, 2019, provisional application No. 62/877,684, filed on Jul. 23, 2019.

(51) Int. Cl.
*E21B 31/03* (2006.01)
*B08B 9/032* (2006.01)
(Continued)

(52) U.S. Cl.
CPC ............. *E21B 31/03* (2013.01); *B08B 9/032* (2013.01); *E21B 41/0007* (2013.01); *E21B 41/04* (2013.01)

(58) Field of Classification Search
CPC ...... E21B 31/03; E21B 41/0007; E21B 41/04; B08B 9/032
(Continued)

(56) References Cited

U.S. PATENT DOCUMENTS 5,778,981 A 7/1998 Head
6,200,068 B1 3/2001 Bath et al.
(Continued)

FOREIGN PATENT DOCUMENTS

EP 2372206 A1 10/2011
EP 3411557 A1 12/2018
(Continued)

OTHER PUBLICATIONS

International Search Report and Written Opinion dated Mar. 6, 2020, for PCT/US2019/064222, filed on Dec. 3, 2019.
(Continued)

*Primary Examiner* — Matthew R Buck
*Assistant Examiner* — Patrick F Lambe
(74) *Attorney, Agent, or Firm* — Conley Rose, P.C.

(57) ABSTRACT

A system for remediating a blockage in a subsea a subsea fluid system includes a hot tap system connected to an outer surface of a subsea fluid conduit of the subsea fluid system, a first flowpath extending from a fluid source, through the first coiled tubing and the hot tap system, and into the subsea fluid conduit, and a second flowpath extending from the subsea fluid conduit and through the hot tap system, wherein the second flowpath is separate from the first flowpath, wherein the hot tap system is configured to inject a first fluid into the subsea fluid conduit along the first flowpath and receive a second fluid from the subsea fluid conduit along the second flowpath.

22 Claims, 27 Drawing Sheets

(51) Int. Cl.
*E21B 41/00* (2006.01)
*E21B 41/04* (2006.01)

(58) Field of Classification Search
USPC ............................................. 134/22.12
See application file for complete search history.

(56) References Cited

U.S. PATENT DOCUMENTS

| | | | |
|---|---|---|---|
| 7,650,944 B1 * | 1/2010 | Boyle | E21B 7/203 |
| | | | 166/344 |
| 7,793,723 B2 | 9/2010 | Vedeld et al. | |
| 7,798,232 B2 | 9/2010 | Headworth | |
| 8,376,050 B2 * | 2/2013 | Cumming | E21B 49/08 |
| | | | 166/345 |
| 8,657,531 B2 | 2/2014 | Rios | |
| 9,714,727 B2 | 7/2017 | Tan | |
| 9,797,223 B1 | 10/2017 | Gordon | |
| 9,993,854 B2 * | 6/2018 | Macaulay | E21B 41/0007 |
| 10,273,785 B2 * | 4/2019 | Older | E21B 43/122 |
| 10,344,549 B2 * | 7/2019 | Skeels | E21B 37/06 |
| 2003/0056954 A1 | 3/2003 | Headworth | |
| 2010/0018693 A1 | 1/2010 | Duncan et al. | |
| 2010/0047022 A1 * | 2/2010 | Le Moign | E21B 17/01 |
| | | | 405/184.1 |
| 2010/0212754 A1 * | 8/2010 | Ayers | F16L 1/26 |
| | | | 137/318 |
| 2015/0060079 A1 | 3/2015 | Clements et al. | |
| 2015/0136409 A1 | 5/2015 | Hall et al. | |
| 2019/0345780 A1 * | 11/2019 | Almerico | E21B 33/064 |

FOREIGN PATENT DOCUMENTS

| | | |
|---|---|---|
| GB | 2457081 A | 8/2009 |
| WO | 200060262 A1 | 10/2000 |
| WO | 20160120624 A3 | 8/2016 |

OTHER PUBLICATIONS

International Search Report and Written Opinion dated Oct. 12, 2020 for PCT/US2020/043100 filed on Jul. 22, 2020.
International Search Report and Written Opinion dated Oct. 12, 2020 for PCT/US2020/043094 filed on Jul. 22, 2020.

* cited by examiner

ND METHODS FOR
SYSTEMS AND METHODS FOR IDENTIFYING BLOCKAGES IN SUBSEA CONDUITS

CROSS-REFERENCE TO RELATED APPLICATIONS

This application claims benefit of U.S. provisional patent application Ser. No. 62/877,864 filed Jul. 23, 2019, and entitled "Systems and Methods for Identifying Blockages in Subsea Conduits," and U.S. provisional patent application Ser. No. 62/877,632 filed Jul. 23, 2019, and entitled "Hot tap and Method," each of which is hereby incorporated herein by reference in its entirety.

STATEMENT REGARDING FEDERALLY SPONSORED RESEARCH OR DEVELOPMENT

Not applicable.

BACKGROUND

Offshore systems for producing hydrocarbons in offshore environments typically include a structure disposed at the waterline (e.g., a production platform), one or more wellbores extending from the seabed into an earthen formation, components disposed at the seabed and coupled to the wellbores (e.g., a subsea tree, template, manifold, pipeline, and pipeline end termination (PLET), etc.), and flowlines extending from the surface to the seabed components (e.g., a riser system, umbilical, etc.). From time to time, blockages may arise in one or more flow passages in the offshore system such as in the components disposed at the seabed. Such blockages may result from asphaltene, natural gas hydrates, or sand or scale.

SUMMARY

An embodiment of a system for remediating a blockage in a subsea a subsea fluid system comprises a hot tap system connected to an outer surface of a subsea fluid conduit of the subsea fluid system, a first flowpath extending from a fluid source, through the first coiled tubing and the hot tap system, and into the subsea fluid conduit, and a second flowpath extending from the subsea fluid conduit and through the hot tap system, wherein the second flowpath is separate from the first flowpath, wherein the hot tap system is configured to inject a first fluid into the subsea fluid conduit along the first flowpath and receive a second fluid from the subsea fluid conduit along the second flowpath. In some embodiments, the system further comprises a surface system disposed on a surface vessel and including a first coil tubing and a second coil tubing, wherein each coil tubing is extendable from the surface vessel, wherein the first coiled tubing and the second coiled tubing are each connected to the hot tap system. In some embodiments, the hot tap system comprises a first hot tap in fluid communication with the first coil tubing and a second hot tap that is entirely spaced from the first hot tap and in fluid communication with the second coil tubing, and the first hot tap is connected to a first end of the jumper and the second hot tap is connected to a second end of the jumper that is opposite the first end. In certain embodiments, the system further comprises a first subsea manifold comprising a first fluid passage and a second fluid passage that is separate from the first fluid passage, wherein the first coil tubing is connectable to the first fluid passage and the second coil tubing is connectable to the second fluid passage, a first jumper connectable to the first fluid passage of the first subsea manifold and the hot tap system, and a second jumper connectable to the second fluid passage of the first subsea manifold and the hot tap system. In certain embodiments, the first subsea manifold comprises a crossover fluid passage extending between the first fluid passage and the second fluid passage. In some embodiments, the system further comprises a second subsea manifold comprising a third fluid passage and a fourth fluid passage that is separate from the third fluid passage, wherein the first coil tubing is connectable to the third fluid passage and the second coil tubing is connectable to the fourth fluid passage. In some embodiments, the first jumper connects to the first fluid passage with a first hot stab connector and the second jumper connects to the second fluid passage with a second hot stab connector. In some embodiments, the system further comprises a third jumper connected between an end of the first coil tubing and the first fluid passage of the subsea manifold, and a fourth jumper connected between an end of the second coil tubing and the second fluid passage of the subsea manifold. In certain embodiments, the first coil tubing is configured to inject the first fluid into the fluid conduit along the first flowpath and the second coil tubing is configured to transport the second fluid received from the jumper along the second flowpath. In certain embodiments, the first fluid comprises a saturated brine solution and the second fluid comprises oil.

An embodiment of a system for remediating a blockage in a subsea fluid system comprises a fluid connection system coupled to an outer surface of a jumper of the subsea fluid system, a surface system disposed on a surface vessel and including a first coil tubing and a second coil tubing, wherein each coil tubing is extendable from the surface vessel and connected to the fluid connection system, wherein the first coil tubing is configured to inject a first fluid into the fluid conduit along a first flowpath and the second coil tubing is configured to transport a second fluid received from the jumper along a second flowpath that is separate from the first flowpath. In some embodiments, the first flowpath extends through a first passage in the fluid connection system and the second flowpath extends through a second passage in the fluid connection system that is separate from the first flowpath. In some embodiments, the fluid connection system comprises a first hot tap including the first passage and a second hot tap including the second passage. In certain embodiments, the surface system comprises an injection pump connected to the first coil tubing and configured to pump a hydrate inhibitor fluid into the fluid conduit of the subsea fluid system. In certain embodiments, the system further comprises a first subsea manifold comprising a first fluid passage and a second fluid passage that is separate from the first fluid passage, wherein the first coil tubing is connected to the first fluid passage and the second coil tubing is connected to the second fluid passage, a first jumper connected to the first fluid passage of the first subsea manifold and the fluid connection system, and a second jumper connected to the second fluid passage of the first subsea manifold and the fluid connection system, wherein the first flowpath extends through the first fluid passage of the first subsea manifold and the first jumper, and the second flowpath extends through the second fluid passage of the first subsea manifold and the second jumper. In certain embodiments, the system further comprises a second subsea manifold comprising a third fluid passage and a fourth fluid passage that is separate from the third fluid passage, wherein the first coil tubing is connectable to the third fluid passage and the second coil tubing is connectable to the fourth fluid passage. In some embodiments, the fluid connection system comprises a hot tap system.

An embodiment of a method for remediating a blockage in a subsea a subsea fluid system comprises (a) flowing a first fluid along a first flowpath from a fluid source, through a hot tap system, and into a subsea fluid conduit of the subsea fluid system, wherein the hot tap system is coupled to an outer surface of the fluid conduit, and (b) flowing a second fluid through along a second flowpath from the subsea fluid conduit and through the hot tap system, wherein the second flowpath is separate from the first flowpath. In some embodiments, (a) comprises pumping a hydrate inhibitor fluid along the first flowpath, the first flowpath extending from a surface system and through a first coil tubing, and (b) comprises depressurizing the fluid conduit of the subsea fluid system, the second flowpath extending through a second coil tubing. In some embodiments, the method further comprises (c) flowing the first fluid through a production riser connected from the subsea fluid system. In certain embodiments, (a) comprises flowing the first fluid through a first fluid passage formed in the hot tap system, and (b) comprises flowing the second fluid through a second fluid passage formed in the hot tap system that is separate from the first fluid passage. In certain embodiments, (a) comprises flowing the first fluid through a first hot tap of the hot tap system, and (b) comprises flowing the second fluid through a second hot tap of the hot tap system that is entirely spaced from the first hot tap.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
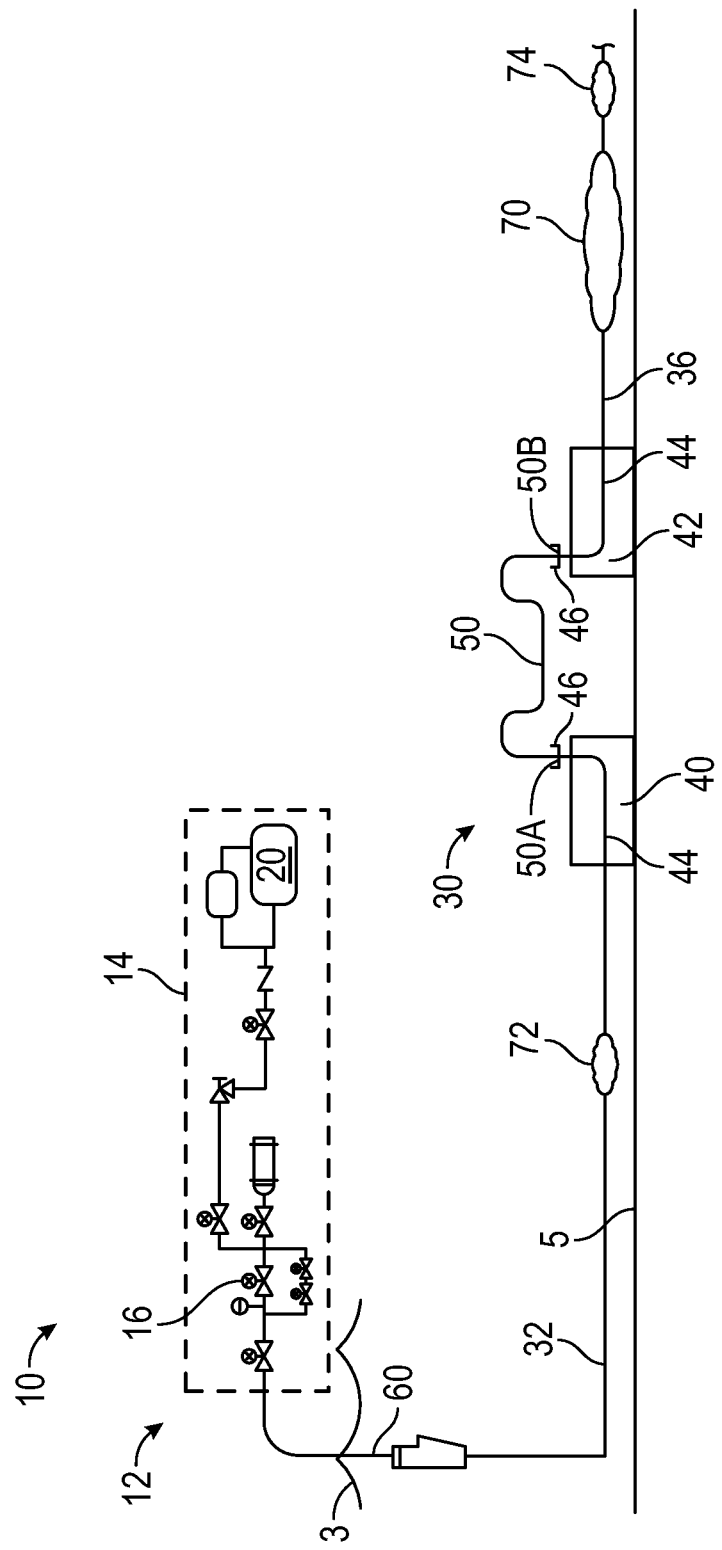
FIG. 1 is a schematic side view of an embodiment of an offshore well system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, offshore systems may include one or more subsea fluid conduits transporting fluids between components positioned on the seabed (e.g., subsea trees, manifolds, PLETs, etc.) as well as components positioned at the surface, and blockages may occur within one or more subsea fluid conduits of the offshore system during the operation thereof. In some applications a "hot tap" may be employed to establish fluid communication with a subsea fluid conduit having a blockage formed therein. As used herein, the term "hot tap" refers to a device configured to penetrate or drill into an outer cylindrical surface of a live subsea fluid conduit having fluid disposed therein to thereby establish fluid communication between the subsea fluid conduit and the hot tap in a manner in which the fluid disposed in the subsea fluid conduit is not exposed to the environment surrounding the subsea fluid conduit. Thus, a hot tap may be used to tap into a live subsea fluid conduit and transport fluids into or out of the subsea fluid conduit without exposing the transported fluids to the subsea environment. Additionally, as used herein, the term "hot tap system" refers to one or more individual hot taps.

Conventional hot taps may clamp about and seal around the entire circumference of the subsea fluid conduit to which they couple. By sealing about the entire circumference of the subsea fluid conduit, the amount of fluid pressure contained within the fluid conduit the conventional hot tap may be capable of sealing may be limited due to relatively large hoop stresses imparted to the conventional hot tap by the pressurized fluid positioned in the annulus between the subsea fluid conduit and the conventional hot tap. Thus, the application of hot taps for intervening in subsea fluid systems may be limited to low pressure applications and thus typically may not be used to intervene in "infield" fluid conduits or flowlines of offshore production systems which contain live production fluids and configured to withstand fluid pressures equaling a shut-in pressure of a subsea wellhead of the production system. Thus, instead of relying on hot taps for forming subsea fluid connections, conventional subsea intervention systems rely on subsea fluid manifolds that fluidically connect to the subsea fluid system at pre-defined hot stab connections which were originally installed in the subsea fluid system. By needing to rely on pre-installed hot stab connections for injecting or receiving fluid from the subsea fluid system, the flexibility of the conventional subsea intervention system is limited as the intervention system is reliant on the pre-placement of hot stab connections in the subsea fluid system.

Accordingly, embodiments are disclosed herein for systems and methods for remediating blockages in subsea fluid conduits which include a hot tap system connected to an outer surface of the subsea fluid conduit and which is configured to inject a first fluid into the subsea conduit along a first flowpath extending through the hot tap system and receive a second fluid from the subsea fluid conduit along a second flowpath also extending through the hot tap system but that is separate from the first flowpath. In this manner, fluid may be circulated into the subsea fluid conduit and recirculated from the subsea fluid conduit using the hot tap system and thus without relying on any fluid connections (e.g., hot stabs) pre-installed onto the subsea fluid conduit or associated components, enhancing the flexibility of the intervention system. Moreover, hot stab systems described herein are capable of sealing high pressures than conventional hot taps and thus the intervention systems described herein may be employed in high pressure applications, including the intervention of blockages formed in infield subsea fluid conduits.

Referring now to FIG. 1, an embodiment of an offshore well system 10 is shown. In the embodiment of FIG. 1, offshore well system 10 is an offshore production system for producing and transporting hydrocarbons from one or more subsea wells; however, in other embodiments, offshore well system 10 may comprise an offshore drilling system for drilling and/or completing one or more subsea wells. In this embodiment, offshore well system 10 generally includes a surface system 12 positioned at a surface or waterline 3, a subsea fluid system 30 positioned at or near a seabed 5, and a fluid conduit 60 extending vertically between surface system 12 and subsea fluid system 30.

The surface system 12 generally includes a surface vessel 14 having process fluid equipment positioned thereon. Particularly, an isolation valve 16 and a process fluid system 20 are each positioned on surface vessel 14. Process fluid system 20 includes various equipment for processing, transporting, and/or storing fluids of offshore well system 10. Isolation valve 16 is positioned between vertical fluid conduit 60 and process fluid system 20, and thus, can adjustably and selectively control fluid communication between process fluid system 20 and subsea fluid system 30. In this embodiment, the surface vessel 14 is a ship (e.g., a drilling or production ship), however, in other embodiments, surface vessel 14 may be an offshore platform (e.g., floating platform, bottom founded platform, etc.).

The subsea fluid system 30 of offshore well system 10 includes a plurality of subsea components 32, 36, 40, 42, 50 positioned at or near the seabed 5. More specifically, in this embodiment, subsea fluid system 30 includes a pair of subsea flowlines or fluid conduits 32, 36, a pair of subsea terminals 40, 42, and a subsea fluid conduit or jumper 50 having a generally cylindrical outer surface 51 (shown in FIG. 1) extending between terminals 40, 42. A first flowline 32 of the pair of flowlines 32, 36 is coupled between vertical fluid conduit 60 and a first terminal 40 of the pair of terminals 40, 42. A second flowline 36 of the pair of flowlines 32, 36 is coupled to a second terminal 42 of the pair of terminals 40, 42. In this embodiment, each terminal 40, 42 includes an internal fluid passage 44 and a vertically oriented (relative to the seabed 5) connector hub 46. Jumper 50 includes a first end 50A coupled to the connector hub 46 of first terminal 40 and a second end 50B, opposite the first end 50A, which is connected to the connector hub 46 of second terminal 42. In this embodiment, jumper 50 comprises a steel jumper; however, in general, the jumper (e.g., jumper 50) may comprise other types of jumpers, including rigid jumpers, used in offshore systems In FIG. 1, subsea terminals 40, 42 are each shown as a pipeline end termination (PLET), however, in other embodiments, each terminal 40, 42 may be any type of subsea equipment including a subsea pipeline end manifold (PLEM), a subsea manifold, a subsea BOP, or any other subsea structure coupled to a subsea conduit that includes a blockage. Additionally, although in FIG. 1 only subsea components 32, 36, 40, 42, 50 of subsea fluid system 30 are shown, in some embodiments subsea fluid system 30 includes one or more additional subsea components in fluid communication with subsea components 32, 36, 40, 42, 50. For instance, the second flowline 36 of subsea fluid system 30 may be connected with one or more PLEMs, manifolds, etc. The vertical fluid conduit 60 of offshore well system 10 is coupled between the first flowline 32 of subsea fluid system 30 and the isolation valve 16 of surface system 10. In this embodiment, vertical fluid conduit 60 is a production riser; however, in other embodiments, vertical fluid conduit 60 may comprise various types of fluid conveying conduits or members, such as a jumper. In some embodiments, subsea fluid conduits 32, 36, and 50 may each comprise infield fluid conduits and thus may transport live production fluids and thus may be configured to withstand fluid pressures equaling a shut-in pressure of a subsea wellhead (not shown in FIG. 1) of subsea fluid system 30.

Blockages may arise in one or more flow passages and/or fluid conduits of offshore well system 10, including within one or more of the subsea components 32, 36, 40, 42, 50 of subsea fluid system 30. Such blockages can undesirably restrict the flow of fluids through the flow passages, and in some extreme cases, completely block the flow of fluids through the flow passages. Embodiments described herein are directed to systems and methods for removing and/or remediating blockages formed in subsea flow passages to enhance fluid flow therethrough during drilling and/or production operations.

Referring now to FIGS. 2-6, an embodiment of an intervention or remediation system 100 is shown. In general, intervention system 100 is employed to identify, and remediate and/or remove blockages formed in the one or more subsea components 32, 36, 40, 42, and 50 of the subsea fluid system 30. In the embodiment shown in FIGS. 2-6, intervention system 100 generally includes a surface vessel 102 having process fluid equipment coupled thereto. For instance, process fluid equipment may be positioned on a deck or platform of surface vessel 102 or may be positioned subsea but coupled to surface vessel 102. In this embodiment, the surface vessel 102 of intervention system 100 comprises a ship (e.g., a drilling or production ship), however, in other embodiments, surface vessel 102 may be an offshore platform (e.g., floating platform, bottom founded platform, etc.).

In this embodiment, the process fluid equipment of intervention system 100 positioned on surface vessel 102 includes a first throughbore tooling 104 (shown in FIGS. 3-5), a first tubing guide or injection assembly 106, a fluid injection pump 108, a fluid source or injection fluid tank 110, and an injection fluid conduit 112. Injection fluid conduit 112 extends between injection pump 108 and injection fluid tank 110. In addition, in this embodiment, an injection valve 114, an injection check valve 116, and an injection pressure sensor or gauge 118 are positioned along injection fluid conduit 112. Injection valve 114 selectively isolates injection pump 108 from first throughbore tooling 104. Injection check valve 116 only permits one-way fluid flow in the discharge direction of injection pump 108 (i.e., flowing towards first throughbore tooling 104), while injection pressure sensor 118 monitors the pressure of injection fluid discharged by injection pump 108.

Additionally, in this embodiment, the process fluid equipment of intervention system 100 positioned on surface vessel 102 also includes a second throughbore tooling 130 (shown in FIGS. 3-5), a second tubing guide or injection assembly 132, and a return fluid conduit 138. In addition, a return valve 140 and a return pressure sensor or gauge 144 are positioned along return fluid conduit 138. In this embodiment, each throughbore tooling 104, 130 of intervention system 100 comprises flexible or coil tubing that is extendable and retractable from surface vessel 102 via the actuation of guide assemblies 106, 132, respectively.

In this embodiment, the process fluid equipment of intervention system 100 positioned on surface vessel 102 further includes a choke valve 150, a process fluid return or tank 152, a process fluid pump 154, a process fluid system 156, and a process fluid conduit 158. Process fluid conduit 158 extends between choke valve 150 and process fluid system 156. In addition, a process valve 160 is positioned along process fluid conduit 158 for selectively isolating process fluid pump 154 from process fluid reservoir 152. The process fluid equipment of intervention system 100 also includes a first crossover fluid conduit 170 extending between injection fluid conduit 112 and choke valve 150. Additionally, return fluid conduit 138 is fluidically connected to first crossover fluid conduit 170. In this configuration, return valve 140 selectively isolates return fluid conduit 138 process fluid conduit 158.

A first isolation valve 172 and a second isolation valve 174 are each positioned along the first crossover fluid conduit 170 to selectively restrict fluid communication between injection fluid conduit 112 and process fluid conduit 158. Return fluid conduit 138 connects with first crossover fluid conduit 170 at a position along conduit 170 located between isolation valves 172, 174, thereby permitting valves 172, 174 to also selectively restrict fluid communication between return fluid conduit 138, and the injection fluid conduit 112 and process fluid conduit 158, respectively. Choke valve 150 of intervention system 100 adjustably controls fluid flow through first crossover fluid conduit 170.

Figure 2:
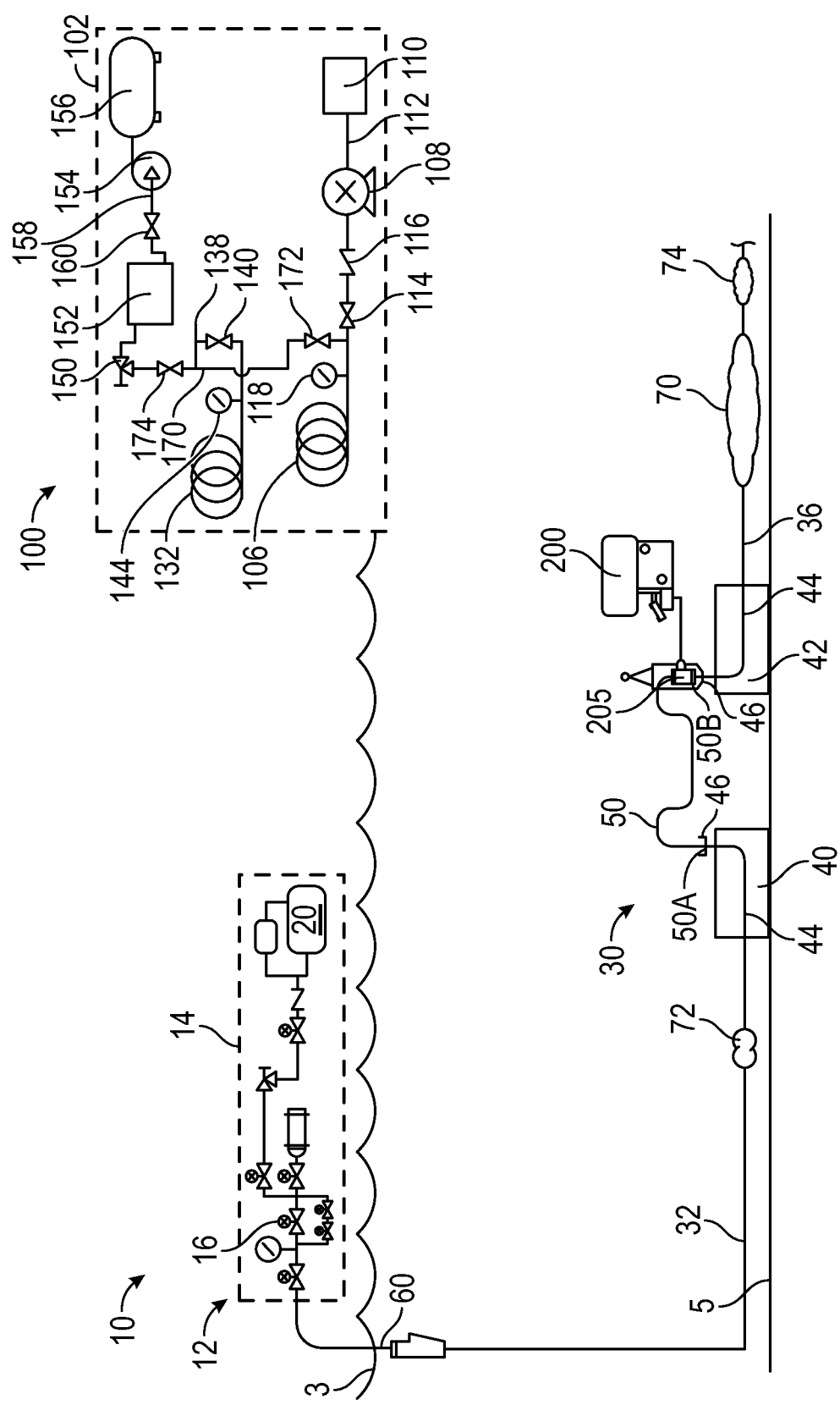
FIGS. 2-6 are sequential, schematic sides views of an embodiment of a subsea intervention system in accordance with principles disclosed herein remediating a blockage formed in the offshore well system of FIG. 1.

As best shown in FIG. 2, in this embodiment, flowlines 32, 36 of offshore well system 10 each comprise a production pipeline that transports production fluids (e.g., hydrocarbons) from one or more subsea wells to subsea terminals 40, 42, respectively. As described above, blockages may form in various subsea conduits and flow lines. In this embodiment, a first or primary blockage 70 resides in second flowline 36, and a pair of second or secondary blockages 72, 74 reside in flowlines 32, 36, respectively. Blockage 70 is positioned between second subsea terminal 42 and the second hydrate blockage 74. In general, the blockages 70, 72, 74 may be formed by any material(s), however, in this embodiment, blockage 70 is an organic blockage comprising an accumulation of organic material such as asphaltenes and each blockage 72, 74 comprises hydrates.

Although operators of offshore well system 10 positioned on surface vessel 12 may identify the formation of at least one blockage of fluid flow in subsea fluid system 30 via a disruption in fluid flow to surface system 12 from vertical fluid conduit 60, the operators of offshore well system 10 may be unable to determine the location of the one or more blockages formed in subsea fluid system 30. For example, operators of offshore well system 10 may determine the presence of organic blockage 70 in subsea fluid system 30, but may be unable to determine if organic blockage 70 is located in first flowline 32, second flowline 36, jumper 50, or some other component of subsea fluid system 30.

As described above, intervention system 100 may be employed to perform a remediation operation to identify the location of one or more blockages formed in subsea fluid system 30, and to remediate or remove the one or more blockages (e.g., organic blockages, inorganic blockages, etc.) formed in the subsea fluid system 30 of offshore well system 10. For example, in an embodiment, the isolation valve 16 of the surface system 12 of offshore well system 10 is closed and the surface vessel 102 of intervention system 100 is deployed to a location proximal offshore well system 10, as shown particularly in FIG. 2. With intervention system 100 deployed at the offshore well system 10, a remotely operated vehicle (ROV) 200 of intervention system 100 is deployed from surface vessel 102 to the subsea fluid system 30 of offshore well system 10.

Once deployed at subsea fluid system 30, ROV 200 installs a fluid connection or hot tap system 205 onto jumper 50 of subsea fluid system 30 at the connector hub 46 of second subsea terminal 42. In this embodiment, hot tap system 205 comprises a single hot tap 205; however, in other embodiments, hot tap system 205 may comprise multiple hot taps. As will be described further herein, hot tap 205 permits fluid access to jumper 50 while preventing fluid within jumper 50 from escaping into the surrounding subsea environment. Thus, hot top assembly 205 of intervention system 100 permits the selective injection of fluids into jumper 50 (as well as other components of subsea fluid system 30) and the selective withdrawal of fluids from jumper 50 while isolating these fluids from the subsea environment. Additionally, hot tap 205 provides for the selective manipulation of fluid pressure within components of subsea fluid system 30, including jumper 50. Although in this embodiment hot top 200 is installed on jumper 50, in other embodiments, ROV 200 of intervention system 100 may install hot tap 205 onto other components of subsea fluid system 30.

Figure 3:
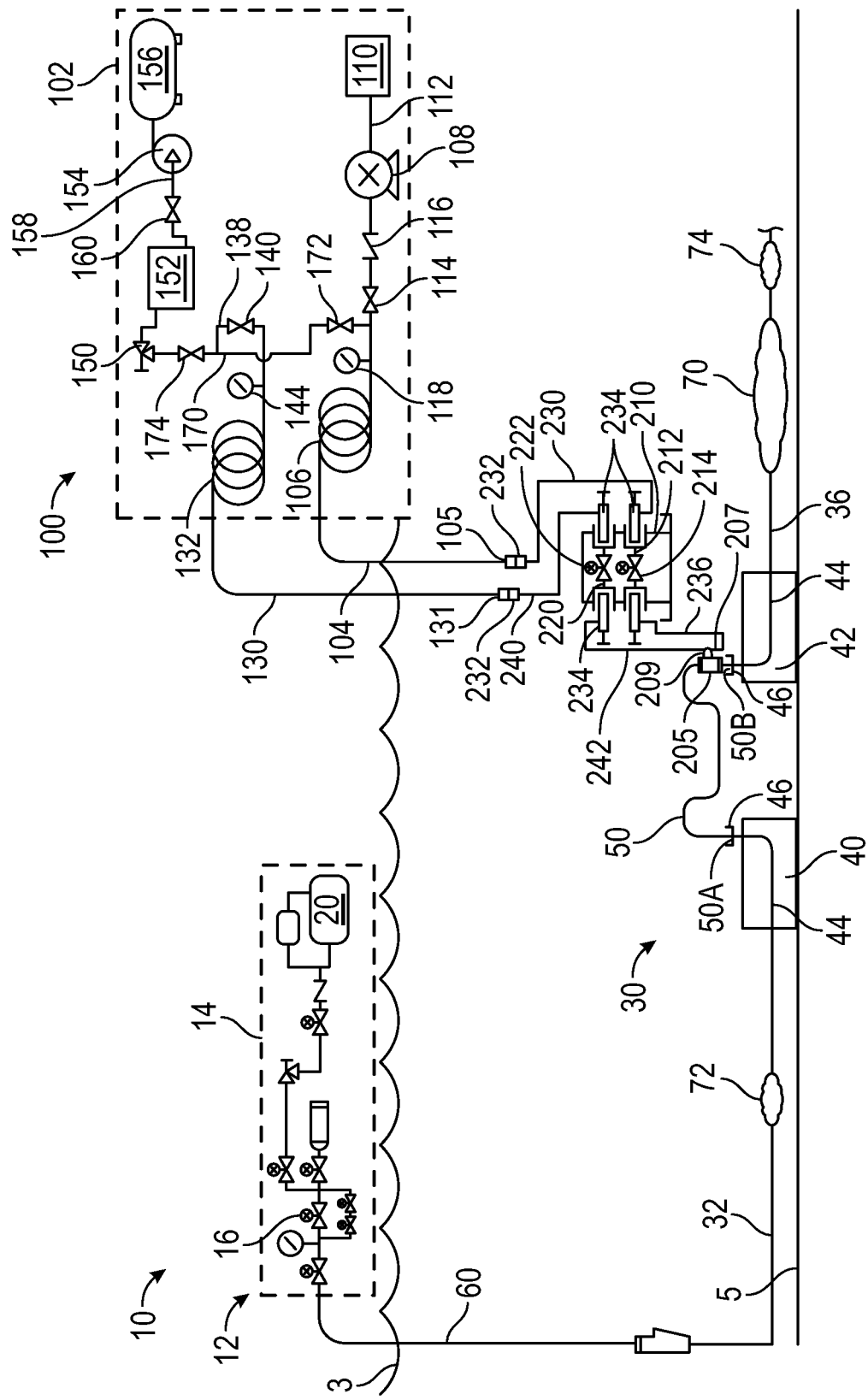

As shown particularly in FIG. 3, in this embodiment, following the installation of hot tap 205 onto the jumper 50 of subsea fluid system 30, a ROV manifold 210 of intervention system 100 is lowered from surface vessel 102 to the seabed 5 at a location proximal hot tap 205. ROV manifold 210 includes a first fluid passage 212 including a first isolation valve 214, and a second fluid passage 220 including a second isolation valve 222. First coil tubing 104 and second coil tubing 130 are each extended towards the ROV manifold 210 positioned at the seabed 5 via the actuation of guide assemblies 106, 132, respectively, until a terminal end 105 of first coil tubing 104 and a terminal end 131 of second coil tubing 130 are positioned proximal ROV manifold 210.

In this embodiment, prior to lowering the terminal ends 105, 131 of coil tubing 104, 130 towards ROV manifold 210, a first injection fluid conduit or jumper 230 is connected to the terminal end 105 of first coil tubing 104 via a quick disconnect coupling 232, and a first return fluid conduit or jumper 240 is connected to the terminal end 131 of second coil tubing 130 via another quick disconnect coupling 232. With jumpers 230, 240 positioned proximal ROV manifold 210, ROV 200 connects first injection jumper 230 and first return jumper 240 to ROV manifold 210 via a pair of subsea or hot stab connectors 234 that can be connected and disconnected subsea by ROV 200. In this embodiment, hot stab connectors 234 comprise stab plate connectors; however, in other embodiments, hot stab connectors 234 may comprise other connectors configured for subsea connectability.

In this configuration, a first end of the first injection jumper 230 is connected to the terminal end 105 of first coil tubing 104 via one of the quick disconnect couplings 232 while a second end of first injection jumper 230 is connected to ROV manifold 210 via one of the hot stab connectors 234, thereby providing fluid communication between the first fluid passage 212 of ROV manifold 210 and the first coil tubing 104. Similarly, a first end of the second injection jumper 240 is connected to the terminal end 131 of second coil tubing 130 via one of the quick disconnect couplings 232 while a second end of second injection jumper 240 is connected to ROV manifold 210 via one of the hot stab connectors 234, thereby providing fluid communication between the second fluid passage 220 of ROV manifold 210 and the second coil tubing 130.

Additionally, in this embodiment, ROV 200 of intervention system 100 connects a second injection fluid conduit or jumper 236 between a first port 207 (shown schematically in FIG. 3) of hot tap 205 and ROV manifold 210 using a hot stab connector 234. Further, ROV 200 connects a second return fluid conduit or jumper 242 between hot tap 205 and ROV manifold 210 using another hot stab connector 234. In this configuration, a first end of the second injection jumper 236 is connected to ROV manifold 210 via one of the hot stab connectors 234 and a second end of second injection jumper 236 is connected to hot tap 205 at the first port 207, thereby providing fluid communication between first fluid passage 212 of ROV manifold 210 and a fluid passage formed in hot tap 205 and in fluid communication with first port 207. Similarly, a first end of the second return jumper 242 is connected to ROV manifold 210 via one of the hot stab connectors 234 and a second end of second return jumper 242 is connected to a second port 209 (shown schematically in FIG. 3) of hot tap 205, thereby providing fluid communication between second fluid passage 220 of ROV manifold 210 and the second port 209 of hot tap 205.

In this embodiment, with injection jumpers 230, 236 and return jumpers 240, 242 connected to ROV manifold 210, ROV 200 extends a subsea-deployable drill through hot tap 205 to drill into a cylindrical outer surface of jumper 50, thereby penetrating a body of jumper 50 and establishing fluid communication between an internal fluid passage of jumper 50 and jumpers 236, 242. In some embodiments, the connections formed between jumpers 236, 242 and the first and second fluid passages of hot tap 205, respectively, may be pressure tested prior to the drilling of jumper 50. Additionally, the connection formed between second return jumper 242 and the second fluid passage of hot tap 205 may be pressure tested following the drilling of jumper 50 to confirm the fluid connection formed between second return jumper 50 and the second fluid passage of hot tap 205.

Following the drilling of jumper 50, in this embodiment, first isolation valve 172 of first crossover fluid conduit 170 and return valve 140 are each closed and a first or injection fluid (which may comprise one or more liquids, gasses, and/or mixed-phase fluids, etc.), such as a hydrate inhibitor fluid, is pumped from injection fluid tank 110, through first coil tubing 104, first injection jumper 230, the first fluid passage 212 of ROV manifold 210, second injection jumper 236, the first fluid passage of hot tap 205, and into jumper 50 of subsea fluid system 30 using injection pump 108. In this manner, the inhibitor fluid travels along a first or injection flowpath 250 (shown in FIG. 4) from injection fluid tank 110, through hot tap 205 (via first port 207), and to jumper 50 of subsea fluid system 30. In this embodiment, the inhibitor fluid pumped from injection fluid tank 110 comprises a saturated brine solution; however, in other embodiments, the composition of the inhibitor fluid pumped from injection fluid tank 110 may vary. The inhibitor fluid is pumped through jumper 50, the portion of first flowline 32 extending between first hydrate blockage 72 and first subsea terminal 40, and the portion of second flowline 36 extending between organic blockage 70 and second subsea terminal 42.

Once inhibitor fluid has been pumped from injection fluid tank 110 into jumper 50, a second fluid (e.g., hydrocarbon containing oil, etc.) disposed in the portion of first flowline 32 extending between first hydrate blockage 72 and first subsea terminal 40, and the portion of second flowline 36 extending between organic blockage 70 and second subsea terminal 42 may be recovered to the surface vessel 102 of intervention system 100 from the subsea fluid system 30. Particularly, the second fluid or oil flows from jumper 50 through the second fluid passage of hot tap 205 (via second port 209), second return jumper 242, second fluid passage 220 of ROV manifold 210, first return jumper 240, and second coil tubing 130 to surface vessel 102. In this manner, oil from subsea fluid system 30 of offshore well system 10 travels along a second or return flowpath 252 (shown in FIG. 4) from jumper 50 to the surface vessel 102 of intervention system 100 while the saturated brine solution, having a relatively greater density than the oil, remains in the subsea fluid system 30. In some embodiments, a longitudinal axis of hot tap 205 may be oriented vertically relative to the seabed 5 to allow the relatively heavy saturated brine solution flow into the subsea fluid system 30 while the oil from subsea fluid system 30 rises vertically through hot tap 205. The saturated brine solution may settle within subsea fluid system 30 and contact one or more blockages (e.g., blockages 70, 72, and 74) formed therein to assist with remediating the one or more blockages.

Figure 4:
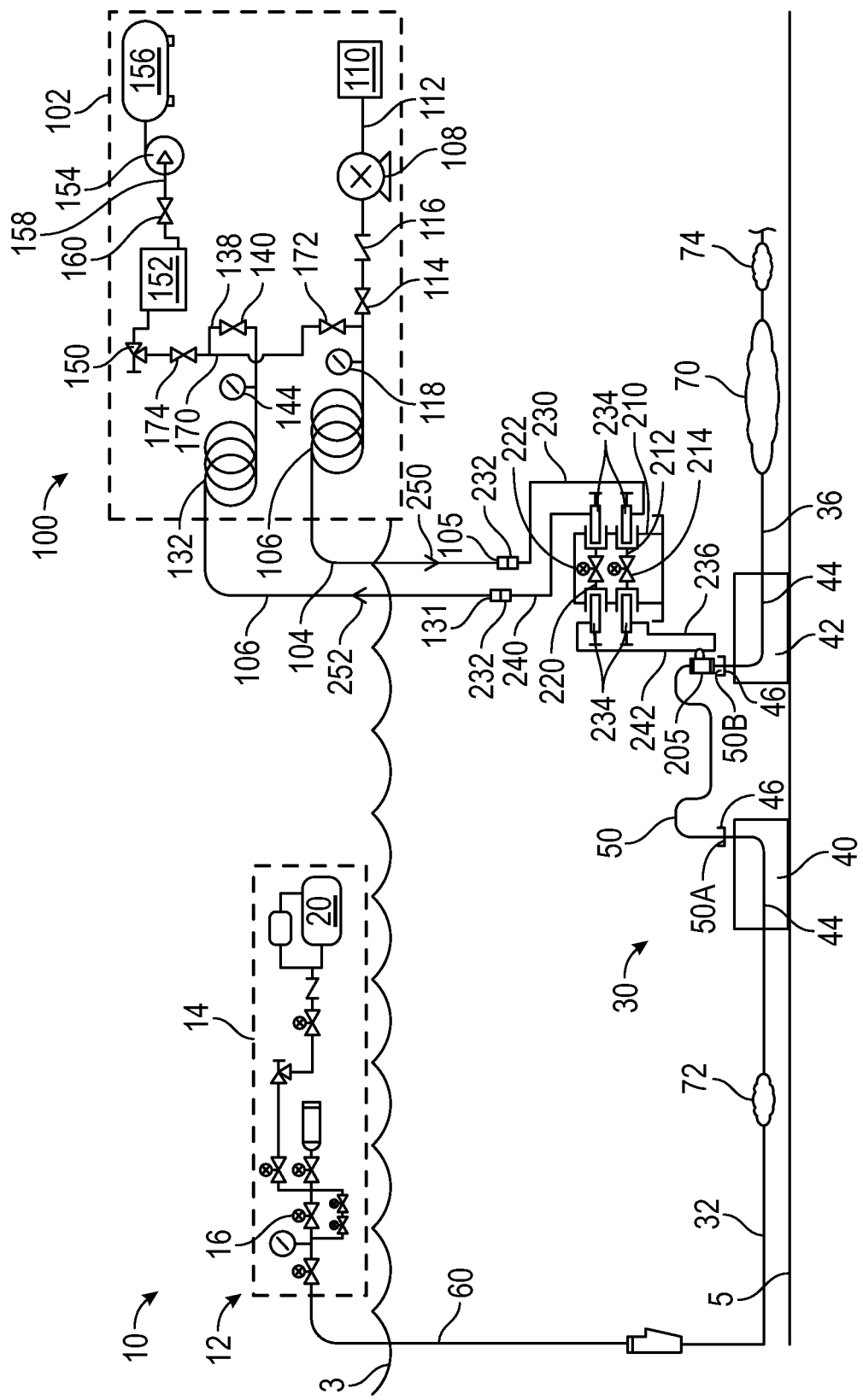
Figure 5:
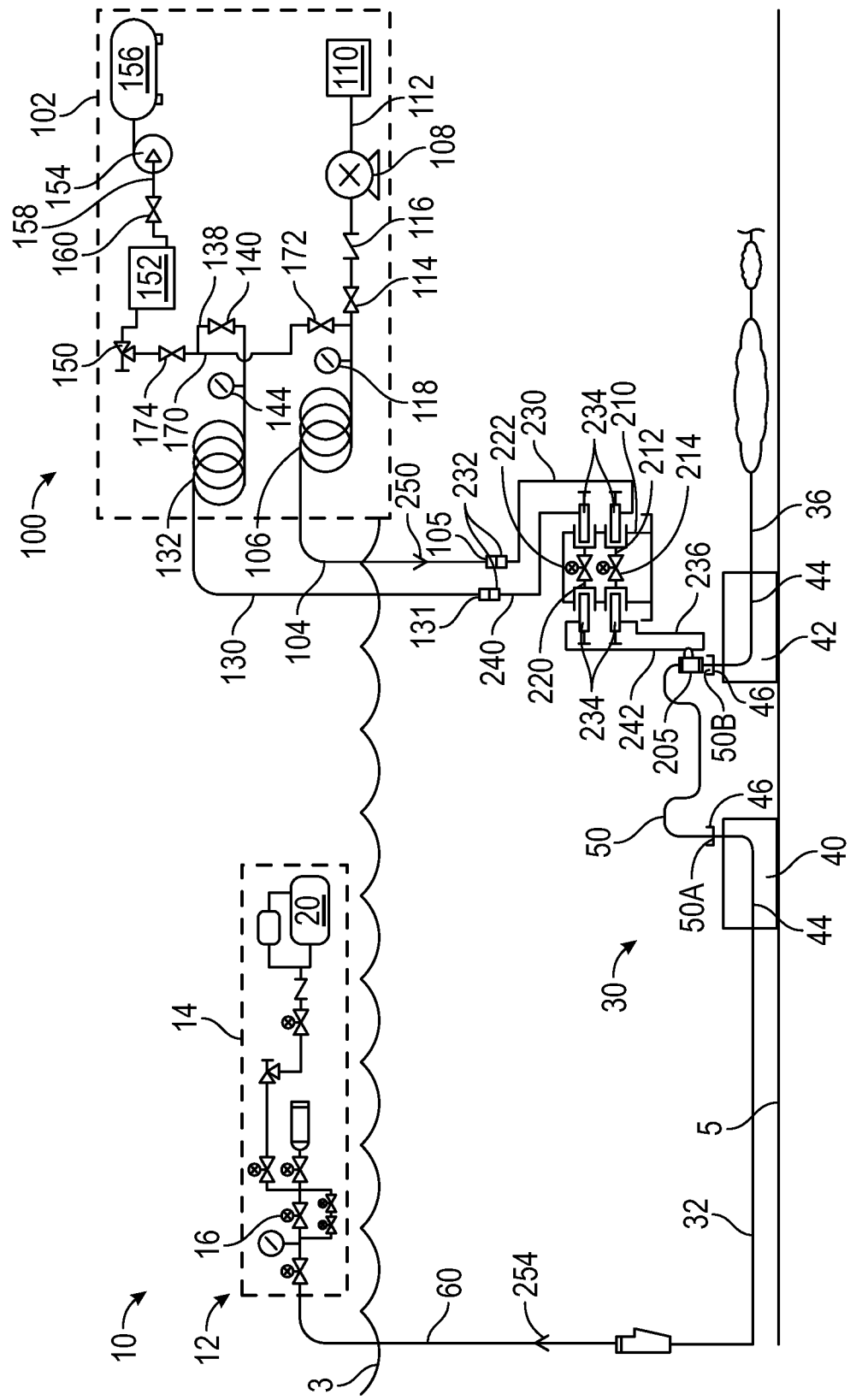
Figure 6:
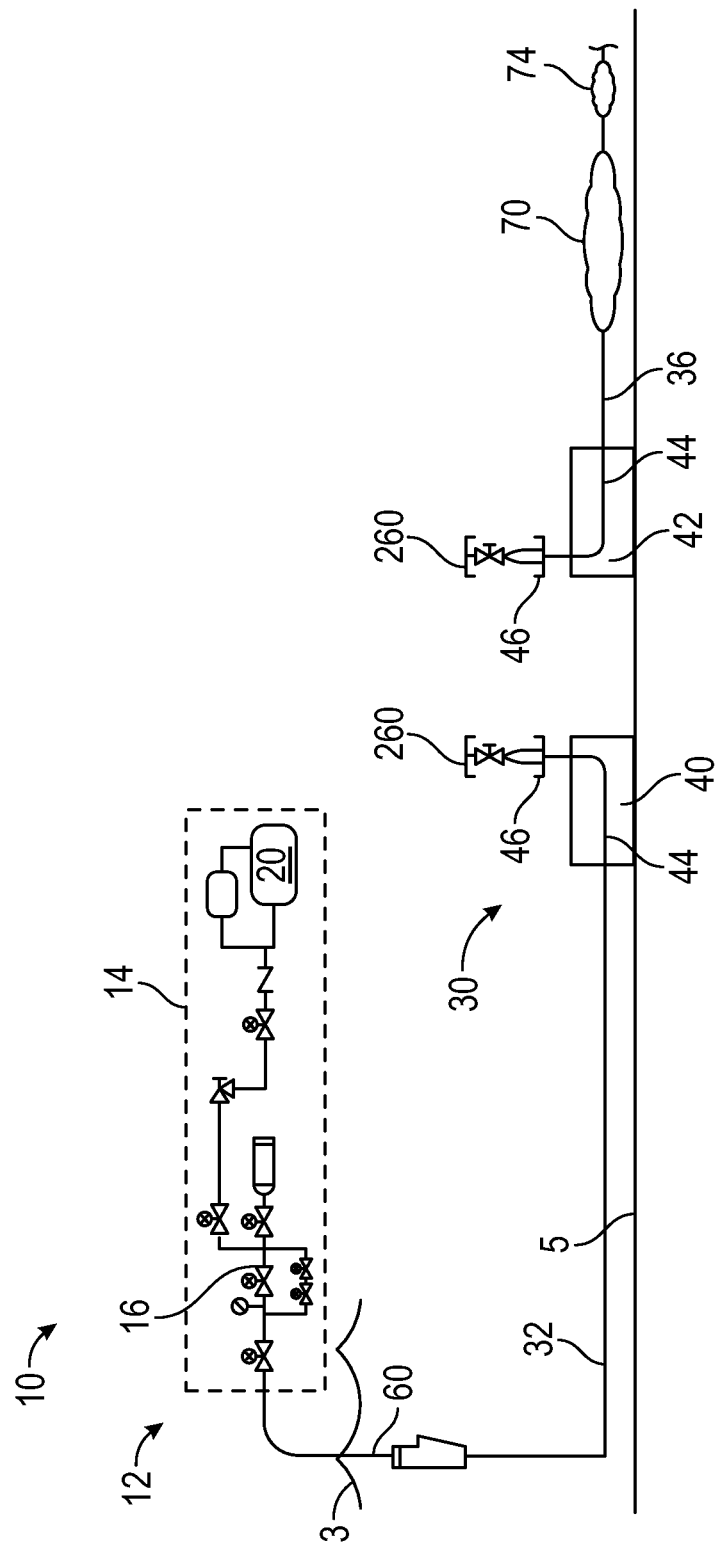
Figure 7:
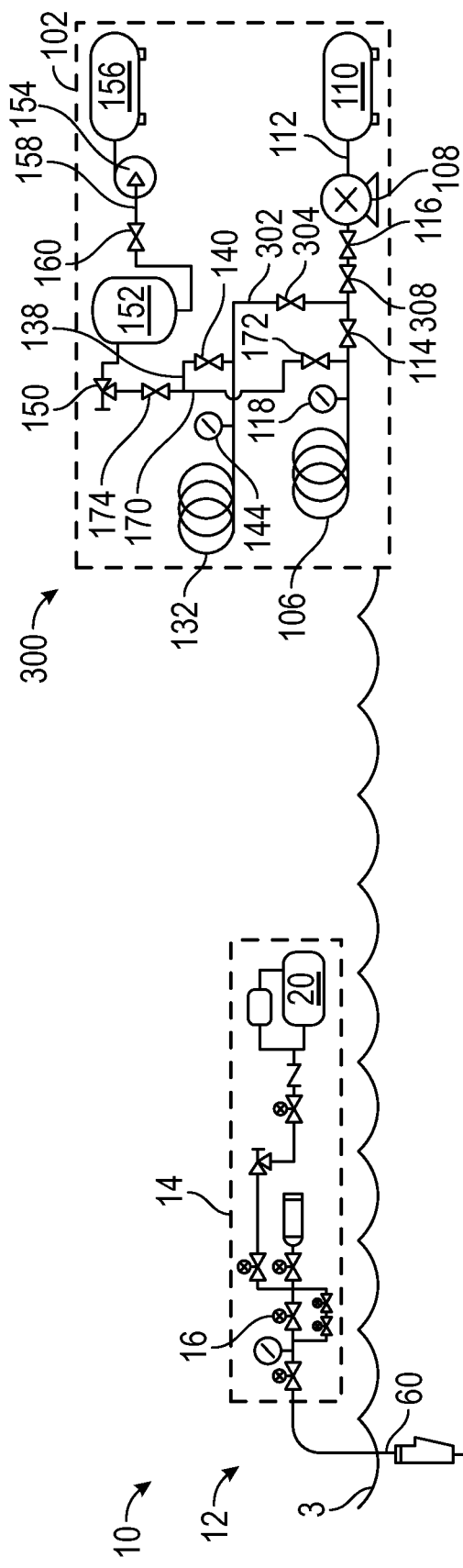
FIGS. 7-14 are sequential, schematic sides views of another embodiment of a subsea intervention system in accordance with principles disclosed herein remediating a blockage formed in the offshore well system of FIG. 1.
Figure 7:
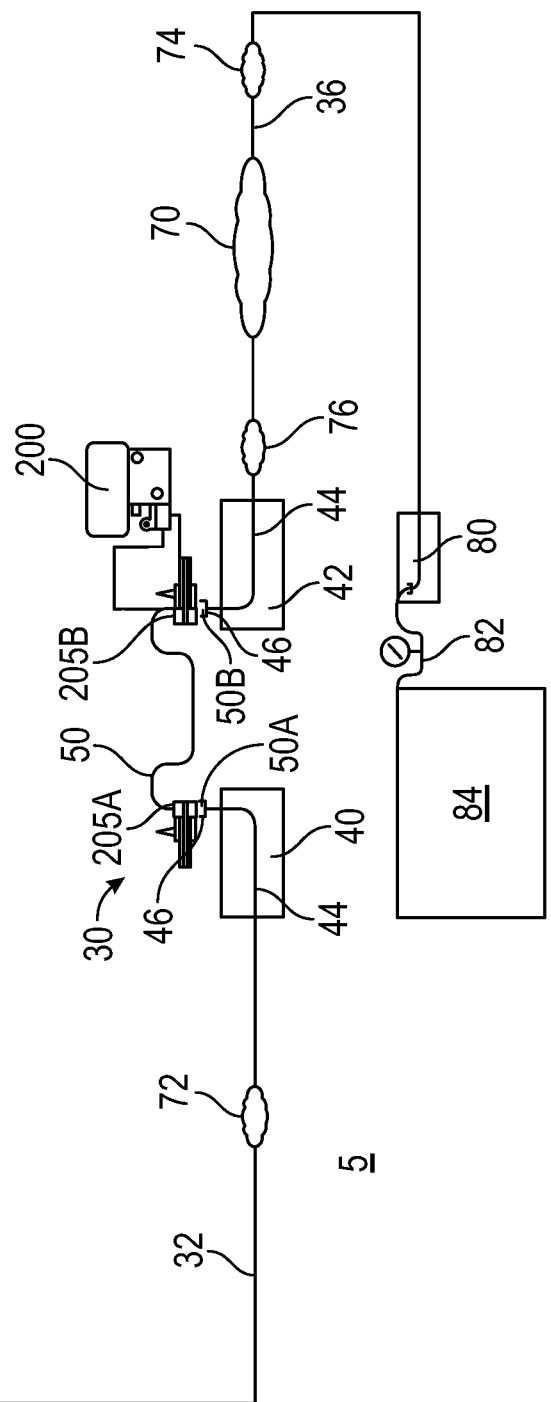

As shown in FIG. 4, while flowpaths 250, 252 each extend through hot tap 205, flowpaths 250, 252 are separate and distinct to thereby allow the circulation of fluids from hot tap 205 into jumper 50 as well as the recirculation of fluids from jumper 50 into hot tap 205. Particularly, flowpaths 250, 252 are separate such that fluid communication therebetween is only permitted through the jumper 50, and thus no fluid communication is permitted directly between flowpaths 250, 252. While in this embodiment the first fluid is injected into jumper 50 from injection fluid tank 110, in other embodiments, ROV 200 or ROV manifold 210 may comprise a fluid source from which an injection fluid (e.g., similar to the injection fluid pumped from injection fluid tank 110 described above) may be injected into jumper 50. Additionally, in some embodiments, ROV 200 or ROV manifold 210 may comprise a tank for receiving the second fluid received from jumper 50.

In some embodiments, oil returns flowing along return flowpath 252 are supplied to process fluid tank 152 and processed using process fluid system 156. In this embodiment, following the circulation of fluids along second flowpath 252, isolation valve 212 of ROV manifold 210 is closed, isolating first coil tubing 104 from subsea fluid system 30, to allow for the depressurization of second coil tubing 130 and the portion of subsea fluid system 30 in fluid communication with second coil tubing 130. Particularly, fluid pressure in jumper 50, the portion of first flowline 32 extending between first hydrate blockage 72 and first subsea terminal 40, and the portion of second flowline 36 extending between organic blockage 70 and second subsea terminal 42, is reduced below the hydrate formation pressure of hydrate blockages 72, 74. In some embodiments, pressure is reduced in the above described portions of subsea fluid system 30 to or below the ambient pressure in the environment surrounding those portions of subsea fluid system 30. The reduction of fluid pressure in first flowline 32 below the hydrate formation pressure of first hydrate blockage 72 destabilizes and at least partially melts first hydrate blockage 72, thereby dislodging first hydrate blockage 72 from first flowline 32.

In addition to dislodging first hydrate blockage 72, the circulation of fluids between intervention system 100 and subsea fluid system 30, identifies the location of the organic blockage 70 in subsea fluid system 30. Particularly, once first hydrate blockage 72 is removed from first flowline 32 of subsea fluid system 30, isolation valve 222 of ROV manifold 210 is closed, isolating second coil tubing 130 from subsea fluid system 30, and isolation valve 214 of ROV manifold 210 is reopened to reestablish fluid communication between first coil tubing 104 and subsea fluid system 30. Additionally, isolation valve 16 of the surface system 12 of offshore well system 10 is opened to permit inhibitor fluid supplied to subsea fluid system 30 by intervention system 100 to flow to surface system 12 along a third or discharge flowpath 254 (shown in FIG. 5) extending from first flowline 32 of subsea fluid system 30, through vertical fluid conduit 60, and to surface system 12.

The flow of fluid along discharge flowpath 254 to surface system 12 confirms that organic blockage 70 is not located in first flowline 32, and instead, is located in either second flowline 36 or a component of subsea fluid system 30 positioned upstream from second flowline 36. Any oil remaining in the portion of subsea fluid system 30 in fluid communication with first coil tubing 104 may also flow to surface system 12 where it can be processed by the process fluid system 20 of surface system 12, thereby cleaning the portion of subsea fluid system 30 in fluid communication with first coil tubing 104 of any remaining oil or other fluids besides the inhibitor fluid supplied by first coil tubing 104.

Once the remaining oil in subsea fluid system 30 has been discharged to surface system 12 along discharge flowpath 254, isolation valve 16 of surface system 12 is closed, and isolation valve 222 of ROV manifold 210 is reopened to permit the performance of one or more lubrication and bleed cycles utilizing flowpaths 250, 252. During this process, the fluid returning to surface vessel 102 of intervention vessel 100 via return flowpath 252 is monitored to confirm that no oil remains in the portion of subsea fluid system 30 in fluid communication with intervention system 100. Once it has been confirmed that the portion of subsea fluid system 30 in fluid communication with intervention system 100 is free of any remaining oil, jumper 50 may be removed from subsea fluid system 30.

Particularly, in this embodiment, ROV 200 is deployed to ROV manifold 210 and disconnects the hot stab connectors 234 coupling first injection jumper 230 and first return jumper 240 with ROV manifold 210, thereby disconnecting ROV manifold 210 from coil tubing 104, 130. Following the disconnection of jumpers 230, 240 from ROV manifold 210, first coil tubing 104 and second coil tubing 130 are each retracted to surface vessel 102 using guide assemblies 106, 132, respectively. Additionally, ROV 200 disconnects the hot stab connectors 234 coupling second injection jumper 236 and second return jumper 242 with ROV manifold 210, thereby disconnecting ROV manifold 210 from the jumper 50 of subsea fluid system 30. Following the disconnection of ROV manifold 210 from jumper 50, ROV manifold 210 is retrieved to surface vessel 102.

In this embodiment, following the retrieval of ROV manifold 210, ROV 200 is retrieved to surface vessel 102 and equipped with one or more connector actuation tools (CAT) (not shown in FIGS. 2-6) and redeployed to jumper 50 of subsea fluid system 30. Additionally, a spreader bar (also not shown in FIGS. 2-6) is lowered from surface vessel 102 to a position adjacent jumper 50. Utilizing the CAT, ROV 200 disconnects the first end 50A of jumper 50 from the connector hub 46 of first subsea terminal 40 and the second end 50B from the connector hub 46 of second subsea terminal 40, and attaches jumper 50 to the spreader bar so that the disconnected jumper 50 may be retrieved to surface vessel 102. Although fluid disposed in flowlines 32, 36 of subsea fluid system 30 may be exposed to the surrounding environment following the removal of jumper 50, given that first flowline 32 and the portion of second flowline 36 extending between second subsea terminal 42 and organic blockage 70 (organic blockage 70 preventing fluid communication between components of subsea fluid system 30 positioned upstream therefrom and second subsea terminal 42) have been purged of oil by intervention system 100, oil is prevented from leaking into the surrounding environment.

Following the disconnection of jumper 50 from subsea terminals 40, 42 of subsea fluid system 30, ROV 200, equipped with the CAT, installs an intervention cap 260 on the connector hub 46 of each subsea terminal 40, 42 of subsea fluid system 30. Intervention caps 260 are configured to selectively isolate the fluid passages 44 of subsea terminals 40, 42 from the surrounding environment. Additionally, in this embodiment, intervention caps 260 are configured to couple with tubular members (e.g., jumpers, etc.) to provide for future intervention in flowlines 32, 36 of subsea fluid system 30. For example, the intervention cap 260 coupled to the second subsea terminal 42 may be used to pass an intervention tool into second flowline 36 to remove organic blockage 70 and/or second hydrate blockage 74 therefrom.

Referring to FIGS. 7-14, another embodiment of an intervention or remediation system 300 employed to identify, and remediate and/or remove blockages formed in the one or more subsea components 32, 36, 40, 42, 50 of the subsea fluid system 30 is shown. Intervention system 300 includes features in common with intervention system 100 shown in FIGS. 2-6, and shared features are labeled similarly. In the embodiment of FIGS. 7-14, the process fluid equipment supported on surface vessel 102 is similar to that of intervention system 100 shown in FIGS. 2-6 except that the process fluid equipment of this embodiment additionally includes a second crossover fluid conduit 302 extending from injection fluid conduit 112 and return fluid conduit 138. As will be described further herein, second crossover fluid conduits 302 permits the pumping of fluid from fluid injection tank 110 through second coil tubing 130. Additionally, an isolation valve 304 is disposed along second crossover fluid conduit 302, another isolation valve 306 is positioned along return fluid conduit 138 between the conjunction of conduits 112 and 170, and the conjunction of conduits 138, 302. Further, another isolation valve 308 is positioned along injection fluid conduit 112 between injection pump 108 and the conjunction of conduits 112, 302.

Additional process fluid equipment of the subsea fluid system 30 of well system 10 are shown in FIGS. 7-14. Particularly, FIGS. 7-14 illustrate a third subsea terminal 80 is connected to an end of second flowline 36. Third subsea terminal 80 is fluidically connected to a subsea production template or manifold 84 via a third subsea flowline 82 extending from third subsea terminal 80 to subsea production manifold 84.

As shown particularly in FIG. 2, in this embodiment, along with hydrate blockages 72, 74 and organic blockage 70, a third hydrate block 76 is formed in second flowline 36 between organic blockage 70 and second subsea terminal 42. As described above, intervention system 300 may be employed to perform a remediation operation to identify the location of one or more blockages formed in subsea fluid system 30, and to remediate or remove the one or more blockages (e.g., organic blockages, inorganic blockages, etc.) formed in the subsea fluid system 30 of offshore well system 10. For example, in an embodiment, the isolation valve 16 of the surface system 12 of offshore well system 10 is closed and the surface vessel 102 of intervention system 300 is deployed to a location proximal offshore well system 10, as shown particularly in FIG. 7.

With intervention system 300 deployed at the offshore well system 10, ROV 200 of intervention system 300 is deployed from surface vessel 102 to the subsea fluid system 30 of offshore well system 10. In this embodiment, intervention system 300 includes a hot tap system 211 that comprises a first hot tap 205A and a second hot tap 205B. In some embodiments, each hot tap 205A, 205B may be configured similarly as the hot tap 205 of intervention system 100 shown in FIGS. 2-6. Once deployed at subsea fluid system 30, in this embodiment, ROV 200 installs first hot tap 205A at the connector hub 46 of first subsea terminal 40 and second hot tap 205B, similar in configuration to first hot tap 205A, at the connector hub 46 of second subsea terminal 42. Particularly, hot tap assemblies 205A, 205B is coupled to jumper 50 proximal ends 50A, 50B. In this embodiment, hot taps 205A, 205B are positioned at the highest vertical locations of jumper 50 relative the seabed 5. In other words, hot tap assemblies 205A, 205B are positioned by ROV 200 at locations along jumper 50 that are vertically above (relative seabed 5) the central portion of jump 50 extending between hot tap assemblies 205A, 205B. Each hot tap 205A, 205B may be vertically spaced from the seabed 5 and the weight of each hot tap 205A, 205B may be supported by jumper 50 and the components of subsea fluid system 30 connected thereto.

Figure 8:
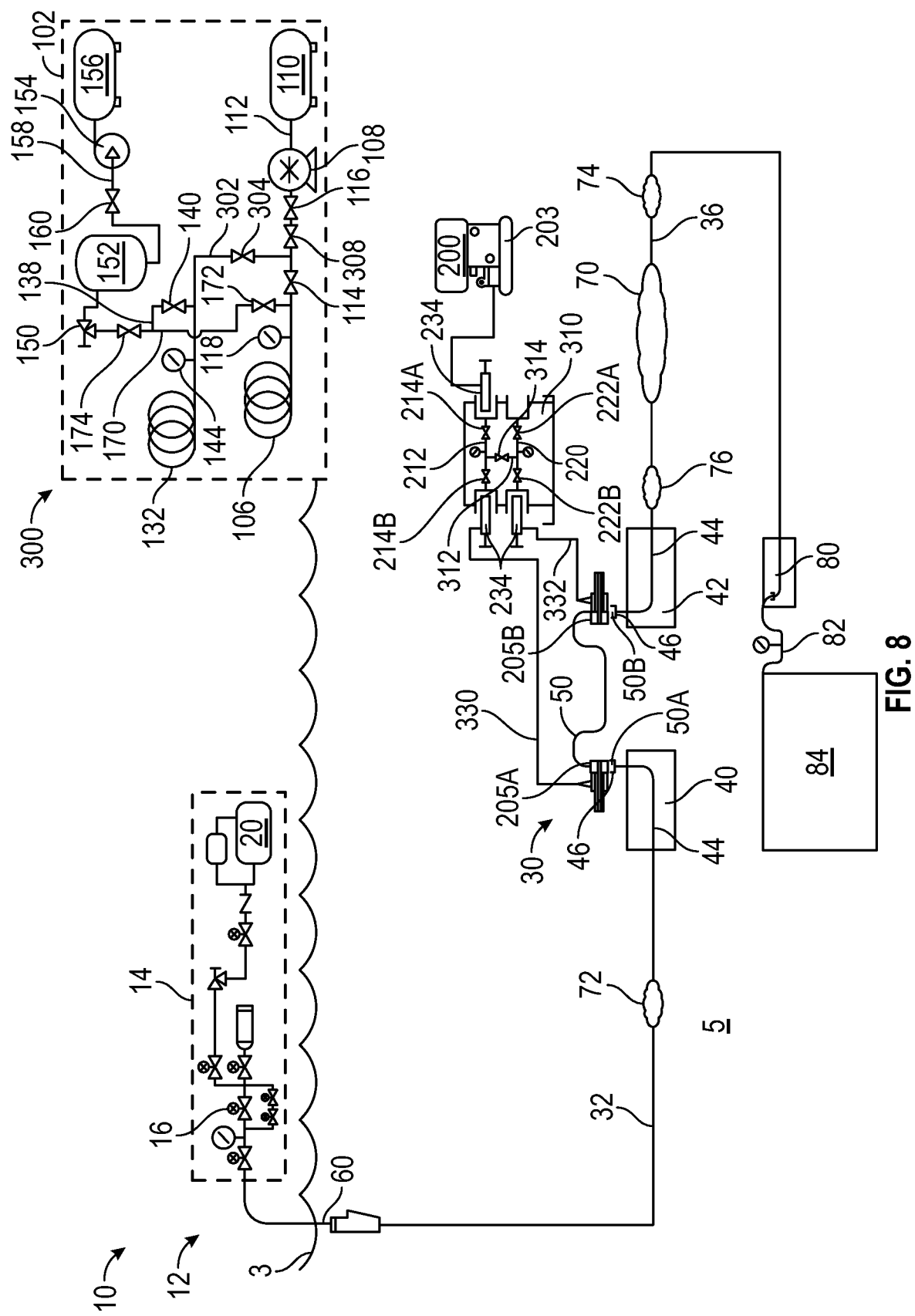
Figure 9:
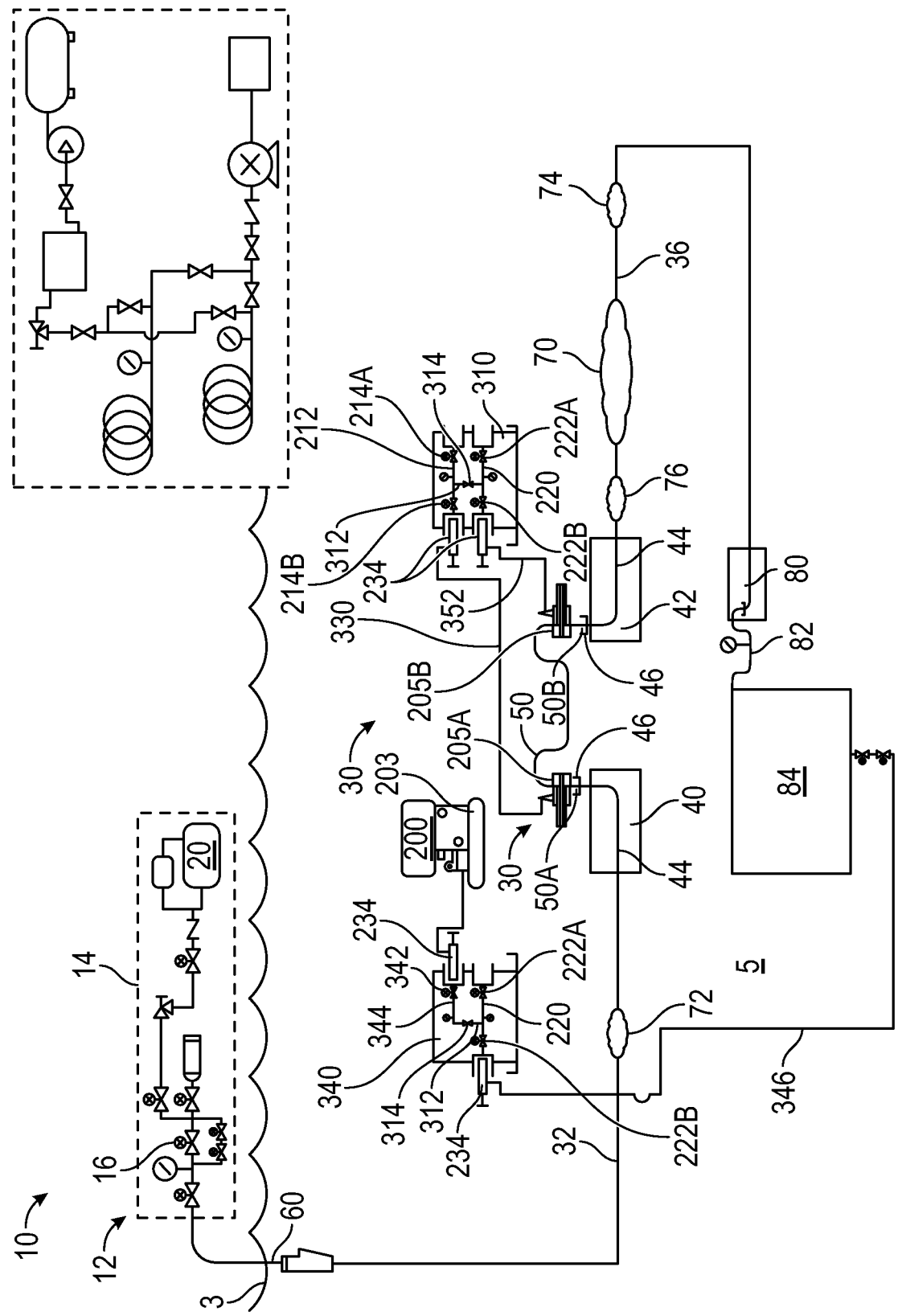
Figure 10:
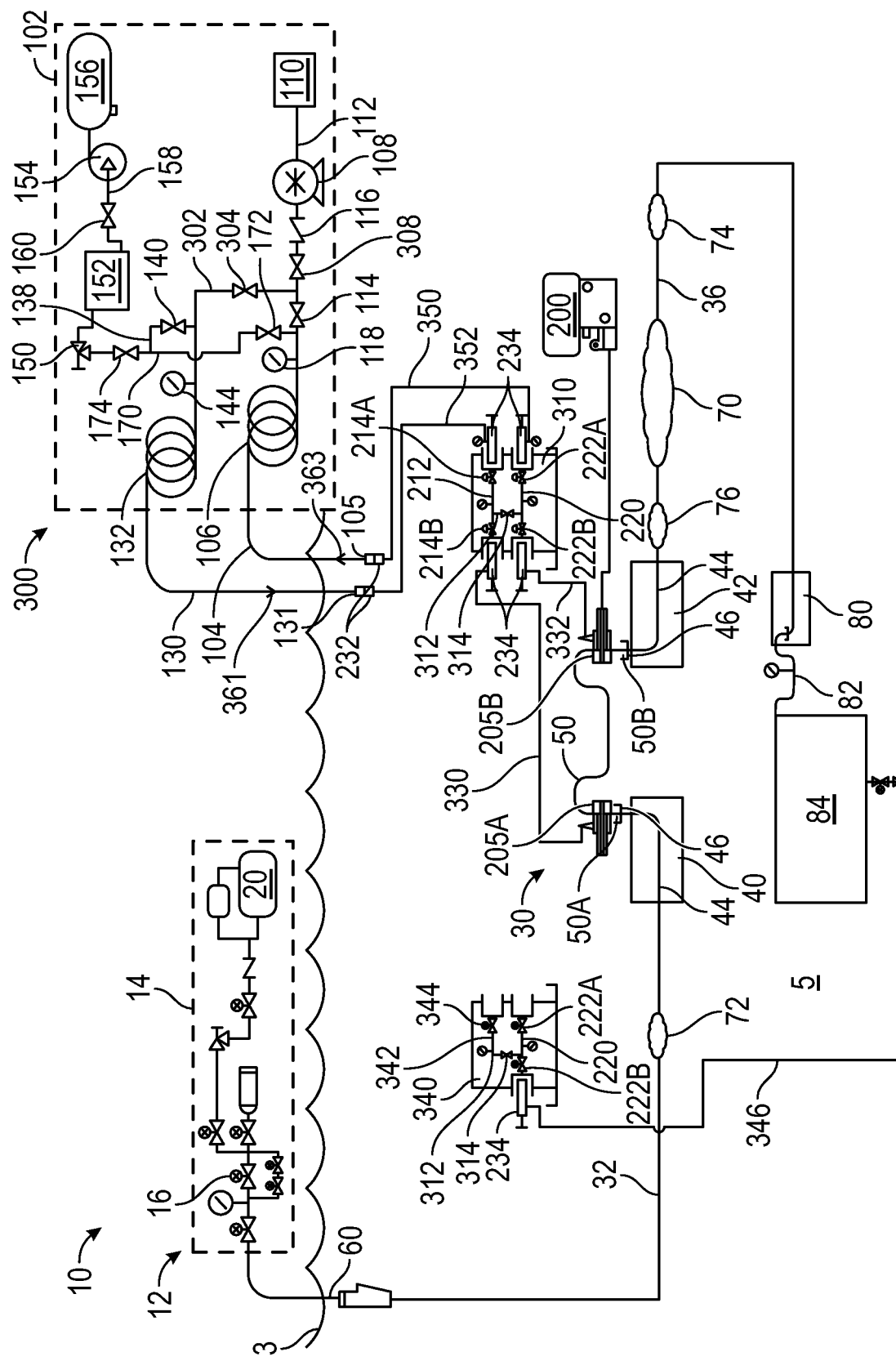
Figure 11:
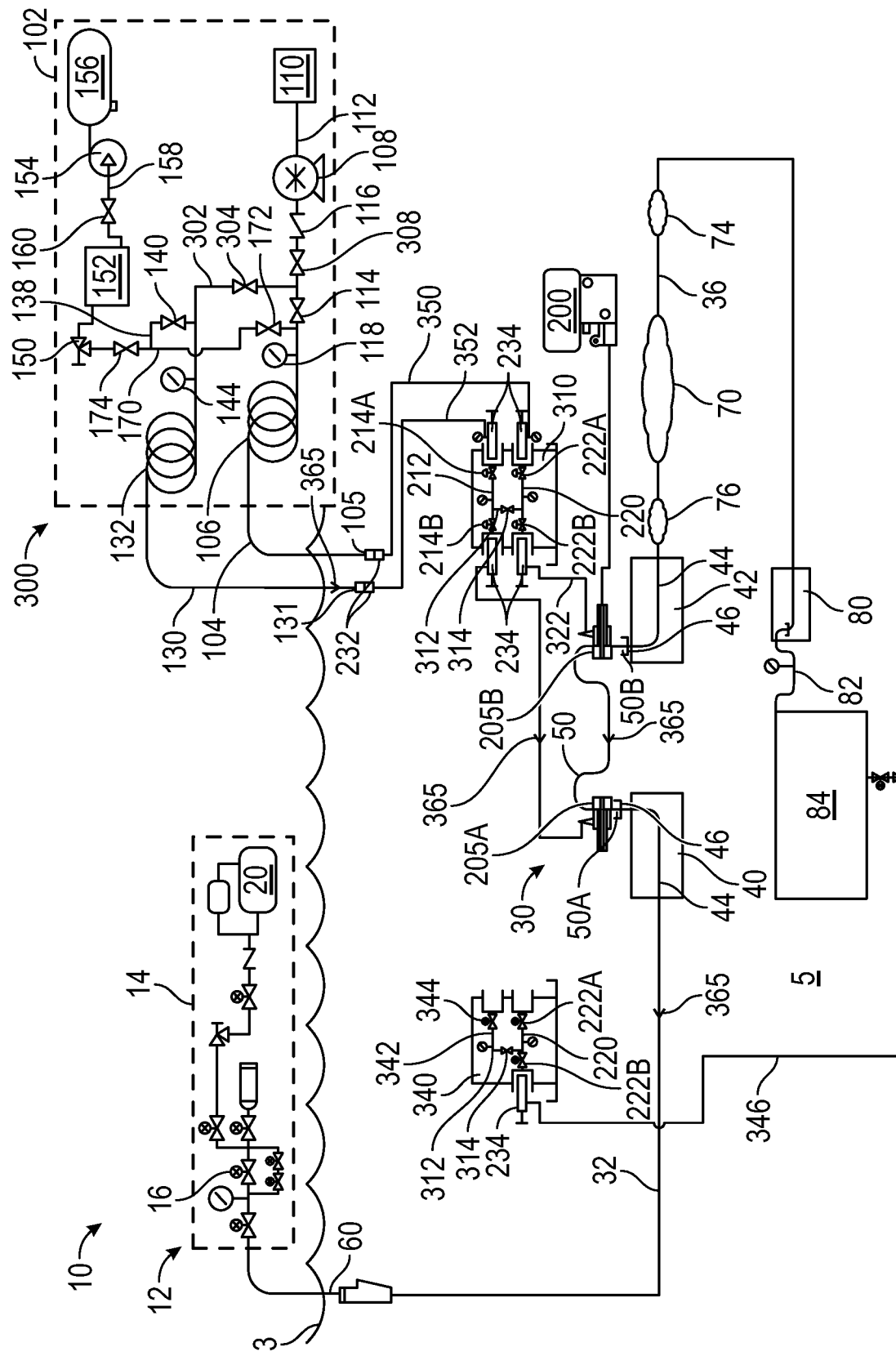
Figure 12:
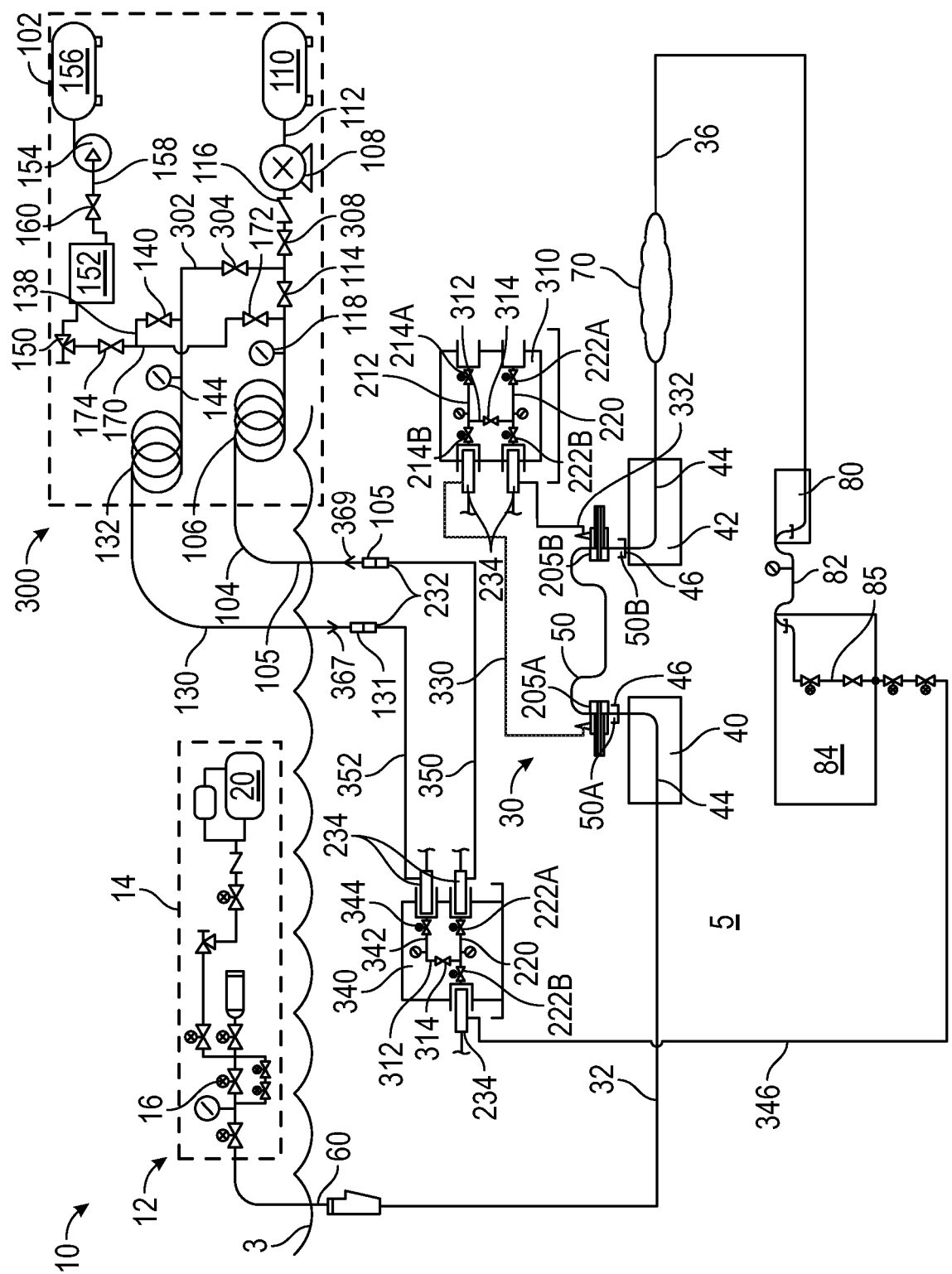
Figure 13:
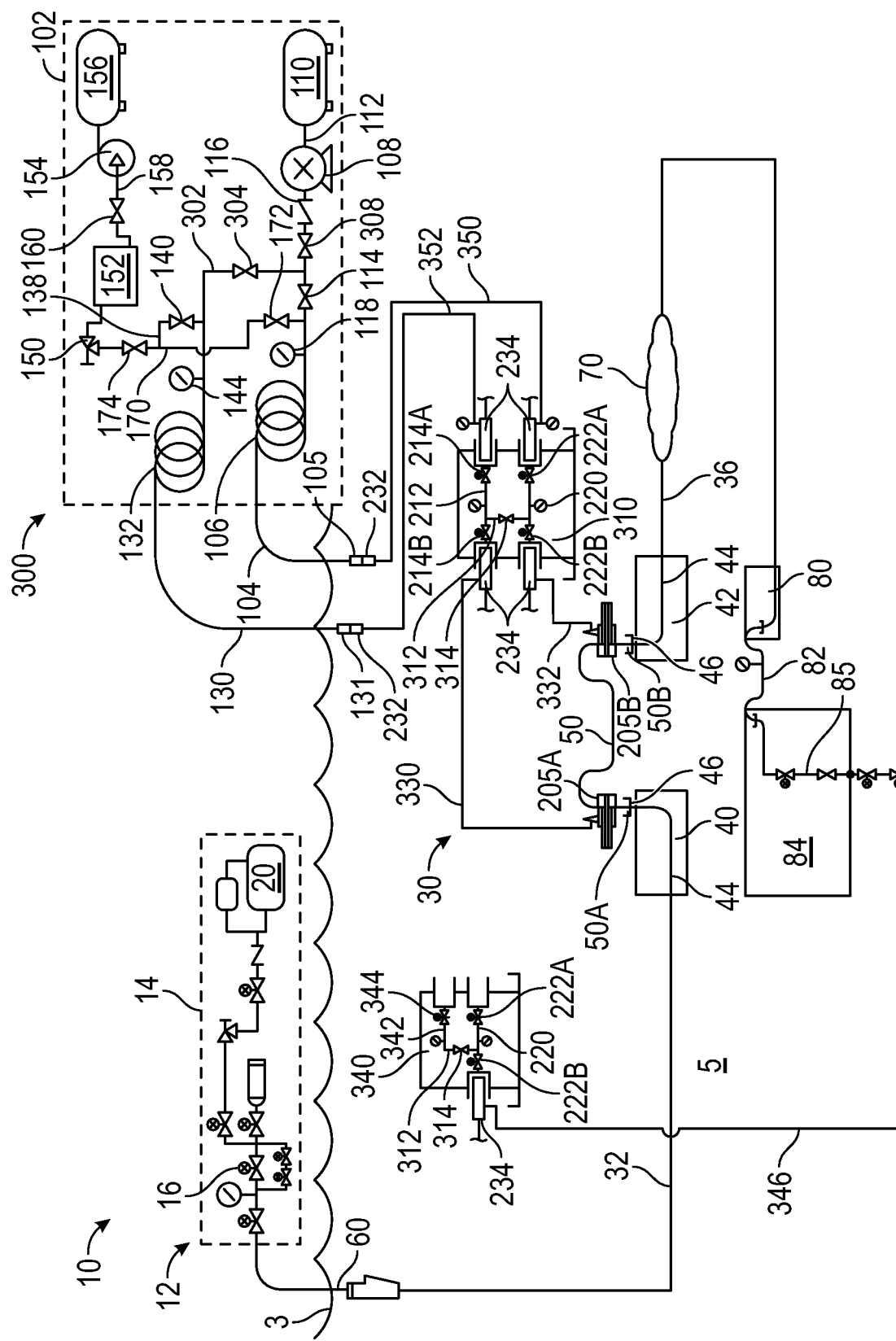
Figure 14:
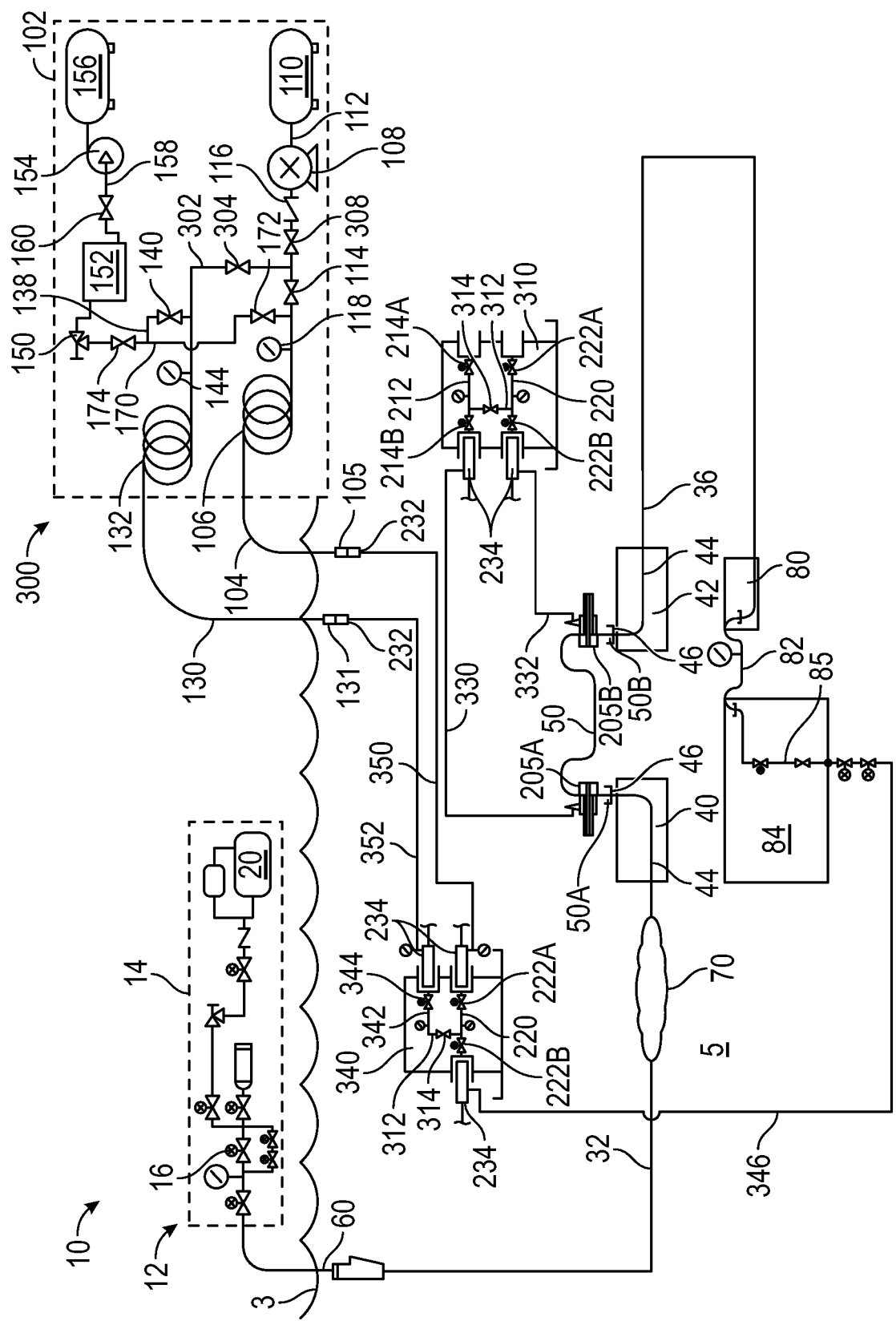

Once hot tap assemblies 205A, 205B are installed on jumper 50 of subsea fluid system 30, a first ROV manifold 310 of intervention system 300 is lowered from surface vessel 102 to the seabed 5 at a location proximal hot tap assemblies 205A, 205B, as shown particularly in FIG. 8. First ROV manifold 310 includes features in common with the ROV manifold 210 shown in FIGS. 3-5, and shared features are labeled similarly. Particularly, first ROV manifold 310 includes a crossover fluid passage 312 extending from first fluid passage 212 to the second fluid passage 220 of first ROV manifold 310. A crossover isolation valve 314 is positioned along the crossover fluid conduit 312. Additionally, first fluid passage 212 includes a pair of isolation vales 214A, 214B flanking the conjunction of crossover fluid conduit 312 and first fluid passage 212. Further, second fluid passage 220 includes a pair of isolation valves 222A, 222B flanking the conjunction of crossover fluid conduit 312 and second fluid passage 220.

ROV 200 fluidically connects a first jumper 330 to the first hot tap 205A and to the first fluid conduit 212 of first ROV manifold 310 via a hot stab connector 234. Additionally, ROV 200 fluidically connects a second jumper 332 to the second hot tap 205B and the second fluid conduit 220 of first ROV manifold 310 via another hot stab connector 234. In this embodiment, following the connection of jumpers 330, 332 with first ROV manifold 310, a second ROV manifold 340 of intervention system 300 is lowered from surface vessel 102 to the seabed 5 at a location proximal the production manifold 84 of subsea fluid system 30, as shown particularly in FIG. 9. Second ROV manifold 340 includes features in common with first ROV manifold 310 and the ROV manifold 210 shown in FIGS. 3-5, and shared features are labeled similarly. In this embodiment, second ROV manifold 340 comprises a first fluid passage 342 including a first isolation valve 344. First fluid passage 342 does not extend entirely through second ROV manifold 340 (passage 342 only includes a single port for receiving a hot stab connector 234) and instead intersects crossover fluid passage 312. With second ROV manifold 340 deployed to production manifold 84, ROV 200 connects a third jumper 346 between second ROV manifold 340 and the production manifold 84 such that fluid communication is established between a fluid passage 85 of production manifold 84 (shown in FIGS. 12-14) and the second fluid passage 220 of second ROV manifold 340. In some embodiments, the connection formed between third jumpers 346 and production manifold 84 may be pressure tested using the vacuum skid 203 attached to ROV 200.

Once second ROV manifold 340 is connected to production manifold 84 via third jumper 346, first coil tubing 104 and second coil tubing 130 are each filled with sea water and lowered towards the first ROV manifold 310. In this embodiment, prior to lowering the terminal ends 105, 131 of coil tubing 104, 130 towards ROV manifold 210, a first circulation conduit or jumper 350 is connected to the terminal end 105 of first coil tubing 104 via quick disconnect coupling 232, and a second circulation conduit or jumper 352 is connected to the terminal end 131 of second coil tubing 130 via another quick disconnect coupling 232, as shown particularly in FIG. 10. With the terminal ends 105, 131 of coil tubing 104, 130 positioned proximal first ROV manifold 310, ROV 200 fluidically connects the first circulation jumper 350 with the second fluid passage 220 of first ROV manifold 310 via a hot stab connector 234. Additionally, ROV 200 fluidically connects the second circulation jumper 352 with the first fluid passage 212 of first ROV manifold 310 via another hot stab connector 234.

With circulation jumpers 350, 352 connected to first ROV manifold 310, ROV 200 extends a subsea-deployable drill through each hot tap 205A, 205B to drill into the outer cylindrical surface of jumper 50, thereby penetrating the body of jumper 50 and establishing fluid communication between an internal fluid passage of jumper 50 and jumpers 330, 332. In some embodiments, the connections formed between jumpers 330, 332 and hot tap assemblies 205A, 205B, respectively, as well as the connections formed between coil tubing 104, 130 and first ROV manifold 310, may be pressure tested prior to the drilling of jumper 50 using a vacuum skid 203 attached to ROV 200. Prior to the drilling of jumper 50, a saturated brine solution is circulated from injection fluid tank 110 and through coil tubing 104, 130 along a first or injection flowpath 361 that extends from injection fluid tank 110 and through first coil tubing 104, through crossover fluid passage 312 in the first ROV manifold 210, and returning to the surface vessel 102 via second coil tubing 130. Although in this embodiment a brine solution is circulated along injection flowpath 361, in other embodiments, various fluids may be circulated along injection flowpath 361, such as one or more noble gasses. In some embodiments, injection flowpath 361 may extend through first ROV manifold 210 and first jumper 330 and into jumper 50 via first hot tap 205A.

Following the drilling of jumper 50, fluid is circulated to jumper 50 of subsea fluid system 30 via first coil tubing 104 and second coil tubing 130. Fluid pressure in jumper 50 and flowlines 32, 36 of subsea fluid system 30 is bled down to depressurize jumper 50, the portion of first flowline 32 extending to first hydrate blockage 72, and the portion of second flowline 36 extending to second hydrate blockage 76 to thereby remediate hydrate blocks 72, 76, as shown particularly in FIG. 11. Once the fluid pressure within subsea fluid system 30 has been bled down and depressurized, returns comprising production fluids of subsea fluid system 30 are taken along a second or return flowpath 363 (shown in FIG. 10) extending through jumpers 332, 350, and first coil tubing 104, where the returns may be handled by the process fluid system 156. In some embodiments, the second fluid circulating along return flowpath 363 may comprise some of the first fluid injected into jumper 50 from injection flowpath 361, such as brine solution or one or more noble gasses.

Given that injection flowpath 361 travels through second coil tubing 130 and first hot tap 205A while return flowpath 363 travels through second hot tap 205B and first coil tubing 104 in some embodiments, fluid may be continuously circulated between surface vessel 102 of intervention system 300 and subsea fluid system 30 of offshore well system 10. In other words, intervention system 300 provides for the simultaneous circulation of fluids from surface vessel 102 to subsea fluid system 30 and from subsea fluid system 30 to surface vessel 102 along separate and distinct flowpaths 361, 363 by utilizing multiple hot tap assemblies 205A, 205B. In some embodiments, cycles of depressurization and returns along return flowpath 363 are repeated until pressure within the fluid passages 212, 220 of first ROV fluid manifold 310 is less than approximately 125-175 pounds per square inch absolute (PSIA), pressure within jumper 50 at the locations of each hot tap 205A, 205 is substantially equal, and fluid communication between coil tubing 104, 130 and both surface system 12 and the production manifold 84 of subsea fluid system 30 is indicated.

Remediation of hydrate blockages 72, 76 may be indicated via fluid communication between second coil tubing 130 and surface system 12. In this embodiment, once remediation of hydrate blocks 72, 76 is confirmed, isolation valve 16 of surface system 12 is opened and valve 222A of first ROV manifold 310 is closed. Fluid is then pumped or bullheaded along a third or bullhead flowpath 365 (shown in FIG. 11) extending through second coil tubing 130, jumpers 352, 365, and first flowline 32 of subsea fluid system 30 where the bullheaded fluid and process fluids remaining in subsea fluid system 30 are circulated to the process fluid system 20 of surface system 12. Additionally, bullhead flowpath 365 also extends through crossover passage 312 of first ROV manifold 310, second jumper 332, and jumper 50 of subsea fluid system 30.

Fluid is circulated along bullhead flowpath 365 until liquid or process fluid returns cease at the surface system 12. In this embodiment, once process fluid returns to surface system 12 cease, isolation valve 16 and crossover vale 314 of first ROV manifold 310 are closed, and valve 222A of first ROV manifold 310 is opened. A saturated brine solution (and/or one or more noble gasses in some embodiments) is then pumped through first coil tubing 104 and circulated through jumper 50, first flowline 32, and the portion of second flowline 36 extending to organic blockage 70. Returns of the saturated brine solution are recirculated to process fluid system 156 via second coil tubing 130. As shown particularly in FIG. 12, following the circulation of the saturated brine solution, each valve of first ROV manifold 310 is closed and coil tubing 104, 130 are disconnected therefrom. Seawater is circulated through the disconnected coil tubing 104, 130, and ROV 200 is deployed to fluidically connect circulation jumpers 350, 352 with the fluid passages 220, 342, respectively, of second ROV manifold 340.

Following the connection of coil tubing 104, 130 with second ROV manifold 340, isolation valve 16 of surface system 12 is opened, valves 222A, 222B, 314, and 344 of second ROV manifold 340 are opened. In this operation a remediation operation similar to the operation described above for remediating hydrate blockages 72, 76 is performed to remediate the second hydrate blockage 74. Particularly, in this embodiment, fluid flows along an injection flowpath 367 (shown in FIG. 12) extending through second coil tubing 130, jumpers 352, 346, flow passage 85 of production manifold 84, and the portion of third flowline 36 extending to second hydrate blockage 74.

The fluid pressure within jumper 346 is then bled down to depressurize the portion of third flowline 36 of subsea fluid system 30 extending to second hydrate blockage 74. Once the fluid pressure within subsea fluid system 30 has been bled down and depressurized, returns comprising production fluids of subsea fluid system 30 are taken along another return flowpath 369 (shown in FIG. 12) extending through jumper 350 and first coil tubing 104, where the returns may be handled by the process fluid system 156. In some embodiments, cycles of depressurization and returns along return flowpath 369 are repeated until pressure within fluid passage 85 of production manifold 84 is less than approximately 125-175 PSIA.

In this embodiment, once second hydrate block 74 has been remediated, each valve of second ROV manifold 340 is closed and coil tubing 104, 130 are disconnected therefrom. ROV 200 is deployed and fluidically connects coil tubing 104, 130 with fluid passages 220, 112, respectively, of first ROV manifold 310, as shown particularly in FIG. 13. In some embodiments, with valves 214A, 214B, 222B, and 314 of first ROV manifold 310 open and valve 222A of manifold 310 closed, fluid may be circulated through coil tubing 104, 130 to test the connections between jumpers 350, 352 and first ROV manifold 310. As fluid is circulated through coil tubing 104, 130, second isolation valve 174 is closed to permit fluid injection pump 108 to build pressure within coil tubing 104, 130 to approximately 800-1,200 pounders per square inch gauge (PSIG), as indicated by pressure sensor 144.

Once a sufficiently high pressure has been built within coil tubing 104, 130, isolation valve 16 and isolation valve 114 are opened, isolation valve 306 is closed, valve 222A of first ROV manifold 310 is opened and valve 222B of manifold 310 is closed. In this configuration, a saturated brine solution (and/or one or more noble gasses in some embodiments) is pumped through second coil tubing 130 from injection fluid tank 110 via second crossover fluid conduit 302. The saturated brine solution flows through jumpers 352, 330, and through the first flowline 32 to the process fluid system 20. The circulation of saturated brine solution flushes uninhibited fluids from first flowline 32 and from riser 60. The saturated brine solution circulated through second coil tubing 130 also contacts the organic blockage 70 formed within the third flowline 36 of subsea fluid system 30.

Once first flowline 32 and riser 60 have been sufficiently flushed, isolation valves 140, 304 are closed and isolation valve 114 is opened (isolation valve 174 remains closed), and fluid injection pump 108 is actuated to pressurize jumper 50 and flowlines 32, 36 to a maximum operating pressure via fluid communication provided by first coil tubing 104. In some embodiments, jumper 50 and flowlines 32, 36 are pressurized to approximately 7,000-7,500 PSIA; however, in other embodiments the level of pressurization of jumper 50 and flowlines 32, 36 may vary. Following the pressurization of jumper 50 and flowlines 32, 36, fluid pressure is monitored at the production manifold 84 to determine if organic blockage 70 has been dislodged, permitting the communication of fluid pressure between first coil tubing 104 and the fluid passage 85 of production manifold 84. In this embodiment, fluid pressure in jumper 50 and flowlines 32, 36 is repeatedly cycled until organic blockage 70 is dislodged, as indicated by the fluid pressure at production manifold 84.

Once organic blockage 70 has been successfully dislodged within third flowline 36, blockage 70 is transported to surface system 12. Particularly, coil tubing 104, 130 are disconnected from first ROV manifold 310 and reconnected to second ROV manifold using ROV 200. In this configuration, ROV 200 places coil tubing 104, 130 in fluid communication with fluid passages 220, 112, respectively, as shown particularly in FIG. 14. Valves 222A, 222B, 314, and 344 of second ROV manifold 340 are opened. A saturated brine solution is then pumped through first coil tubing 104, third jumper 346, and second flowline 36 to bullhead or forcibly displace organic blockage 70 from second flowline 36 through jumper 50, first flowline 32, and riser 60 to the surface system 12 where organic blockage 70 may be processed by process fluid system 20. Saturated brine solution pumped through first coil tubing 104 is prevented from recirculating to surface vessel 102 through second coil tubing 130 via the closure of valves 140, 174.

Following the removal of organic blockage 70 from subsea fluid system 30, at least some of the components of subsea fluid system 30 are flushed with water and ROV manifolds 310, 340 are disconnected from subsea fluid system 30 and retrieved to surface vessel 102 using ROV 200. With ROV manifolds 310, 340 retrieved to surface vessel 102, jumper 50 is removed from subsea fluid system 30 in a manner similar to that described above with respect to intervention system 100 and shown particularly in FIG. 6.

Figure 15:
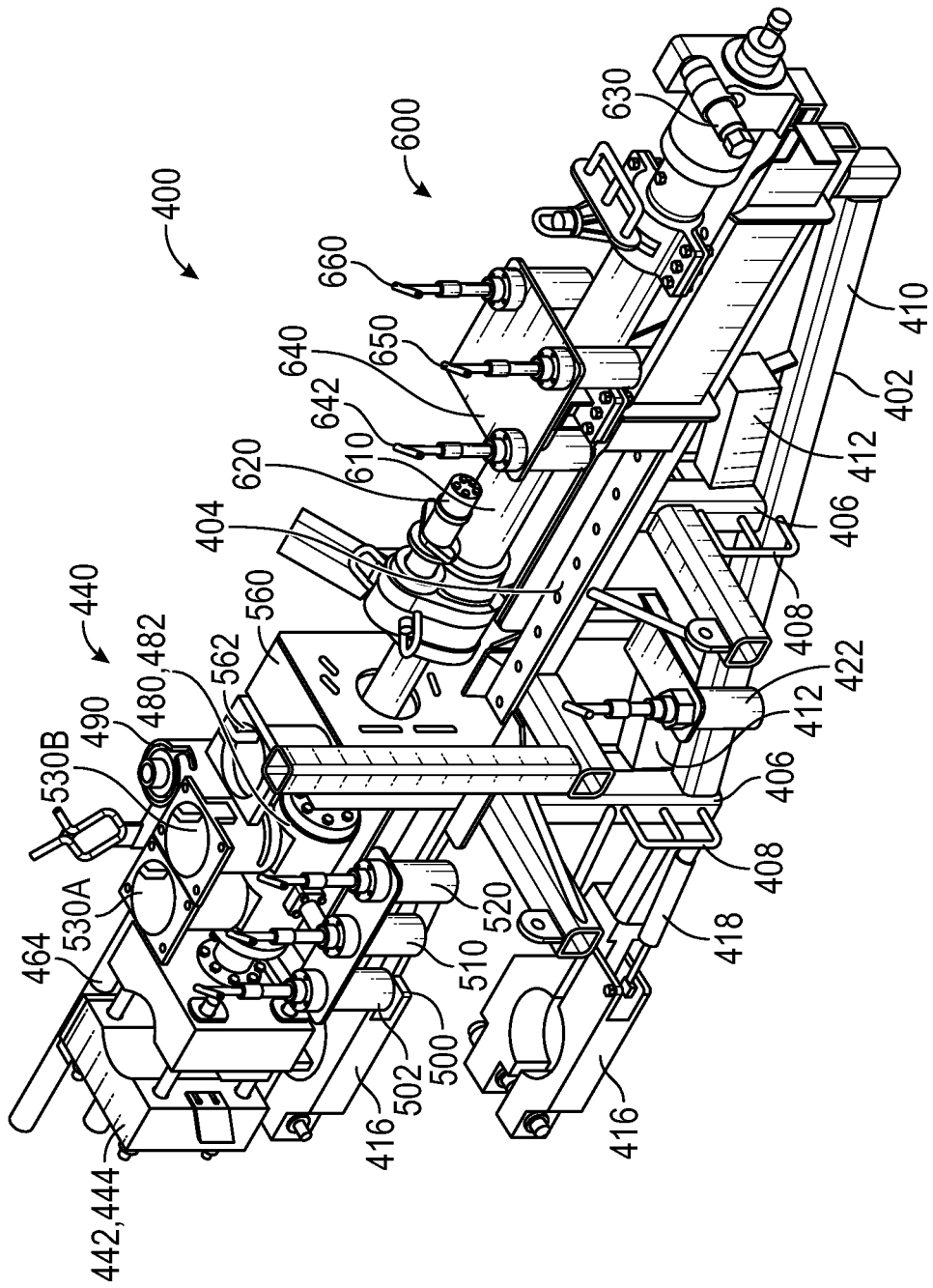
FIG. 15 is a perspective view of an embodiment of a hot tap of the subsea intervention system of FIG. 2 in accordance with principles disclosed herein.
Figure 16:
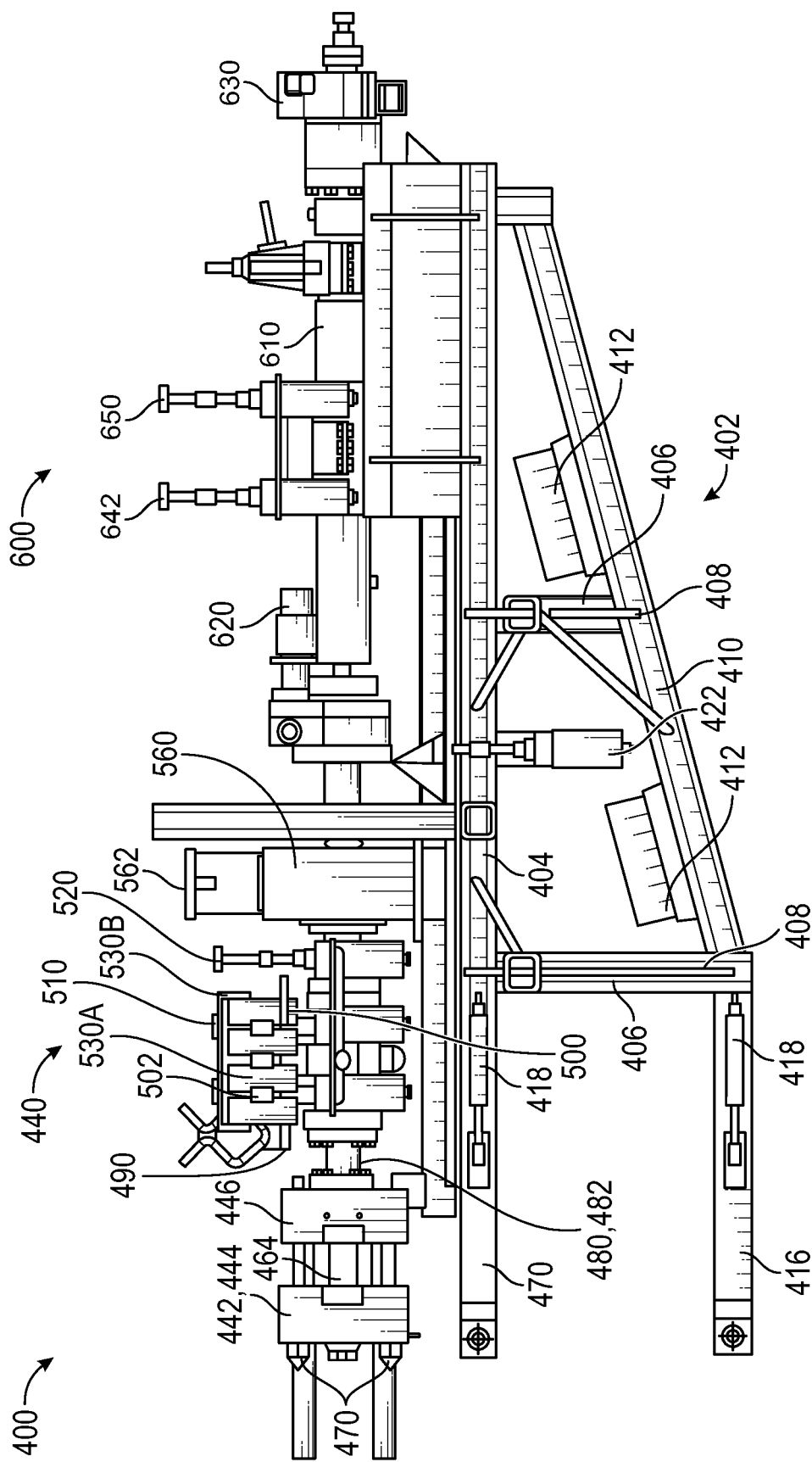
FIG. 16 is a side view of the hot tap of FIG. 15.
Figure 17:
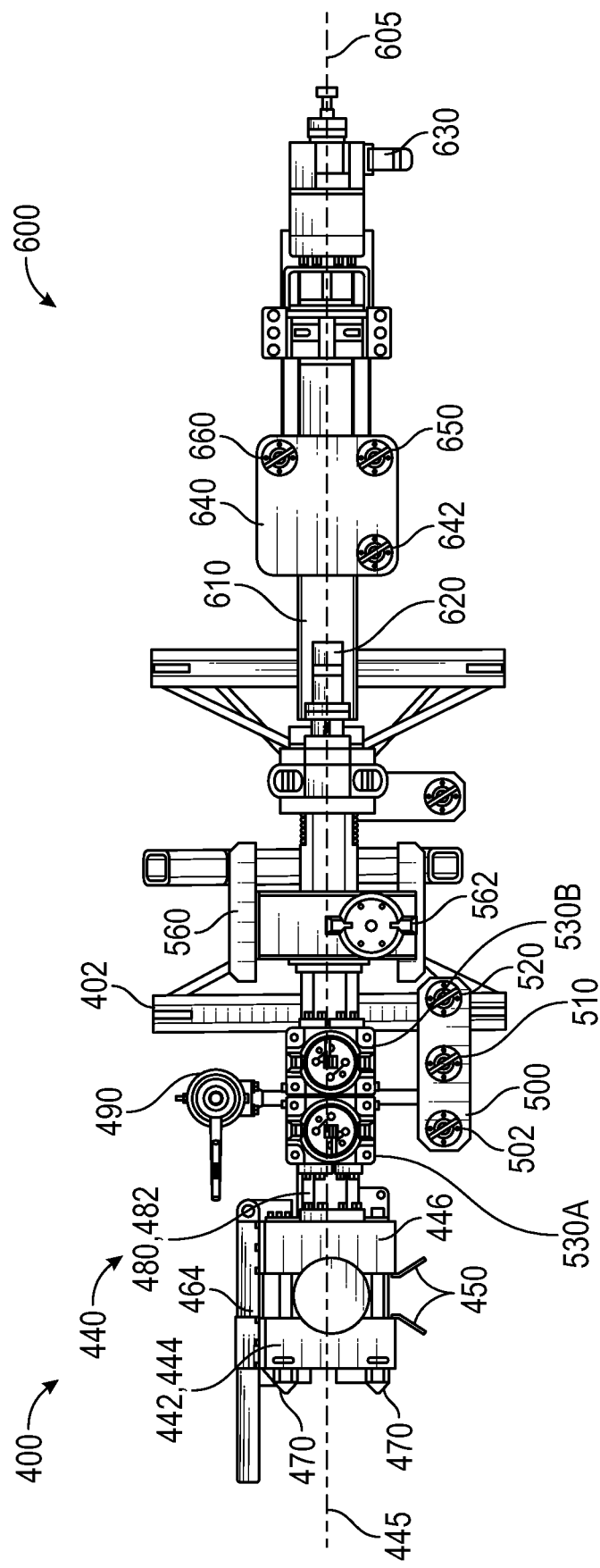
FIG. 17 is a top view of the hot tap of FIG. 15.

Referring to FIGS. 15-17, an embodiment of a hot tap 400 of the intervention system 100 of FIG. 1 is shown. In some embodiments, hot tap 205 shown in FIGS. 2-6 may comprise the hot tap 400 described below and shown in FIGS. 15-17. Similarly, in some embodiments, hot taps 205A, 205B shown in FIGS. 7-14 may comprise the hot tap 400 shown in FIGS. 15-17. In this embodiment, hot tap 400 generally includes a support frame or dynamic landing structure 402, a clamp assembly 440, and a drill assembly 600. Landing structure 402 of hot tap 400 releasably couples to subsea components of subsea fluid system 30, including jumper 50. Particularly, landing structure 402 transfers structural loads from clamp assembly 440 and drill assembly 600 to the subsea component to which landing structure 402 is attached and stabilizes the position of clamp assembly 440 relative to the subsea fluid conduit to which it is intended to attach, permitting the clamp assembly 440 to close over the subsea fluid conduit.

Figure 18:
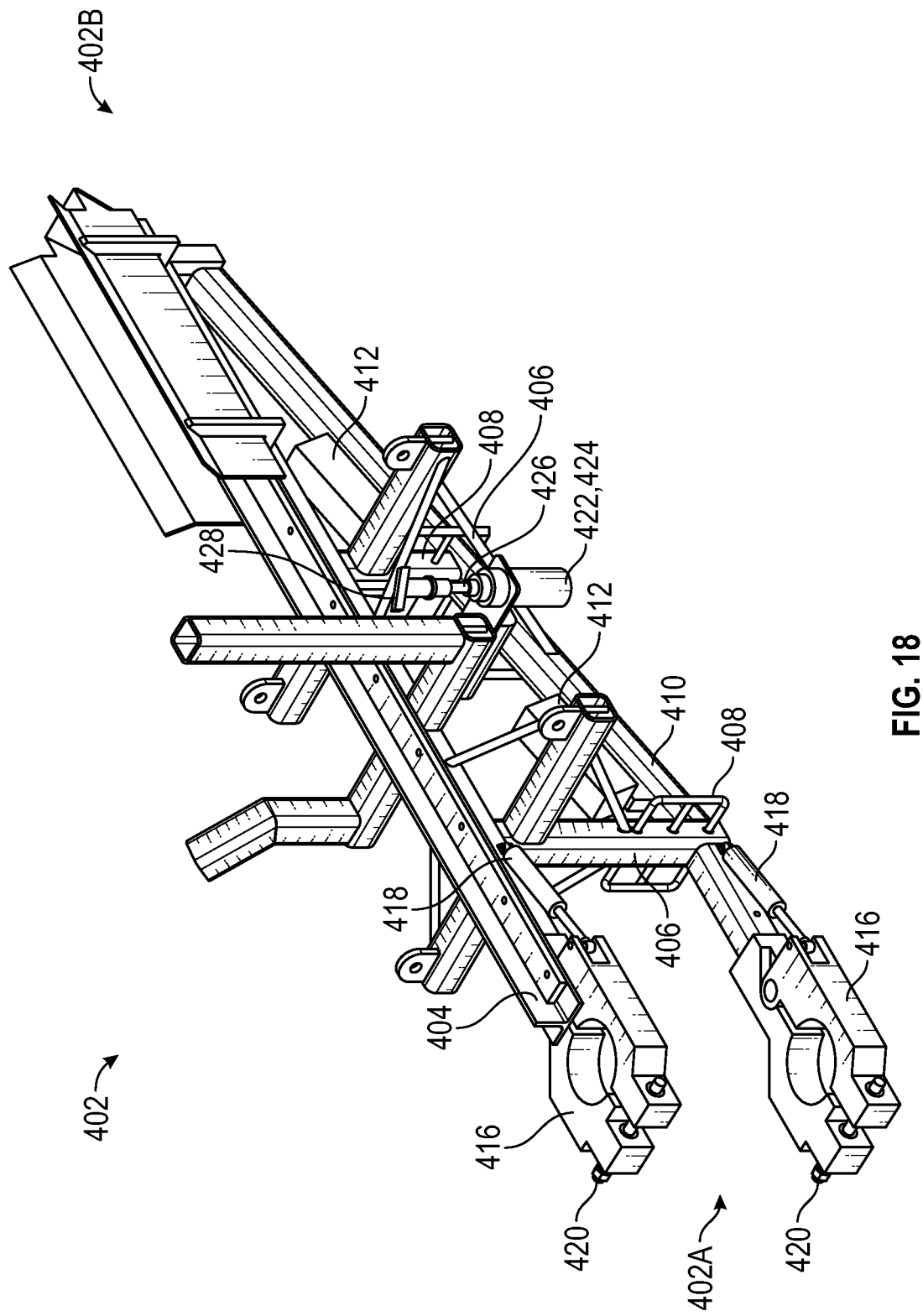
FIG. 18 is a perspective view of an embodiment of a landing structure in accordance with principles disclosed herein for deploying the hot tap of FIG. 15.
Figure 19:
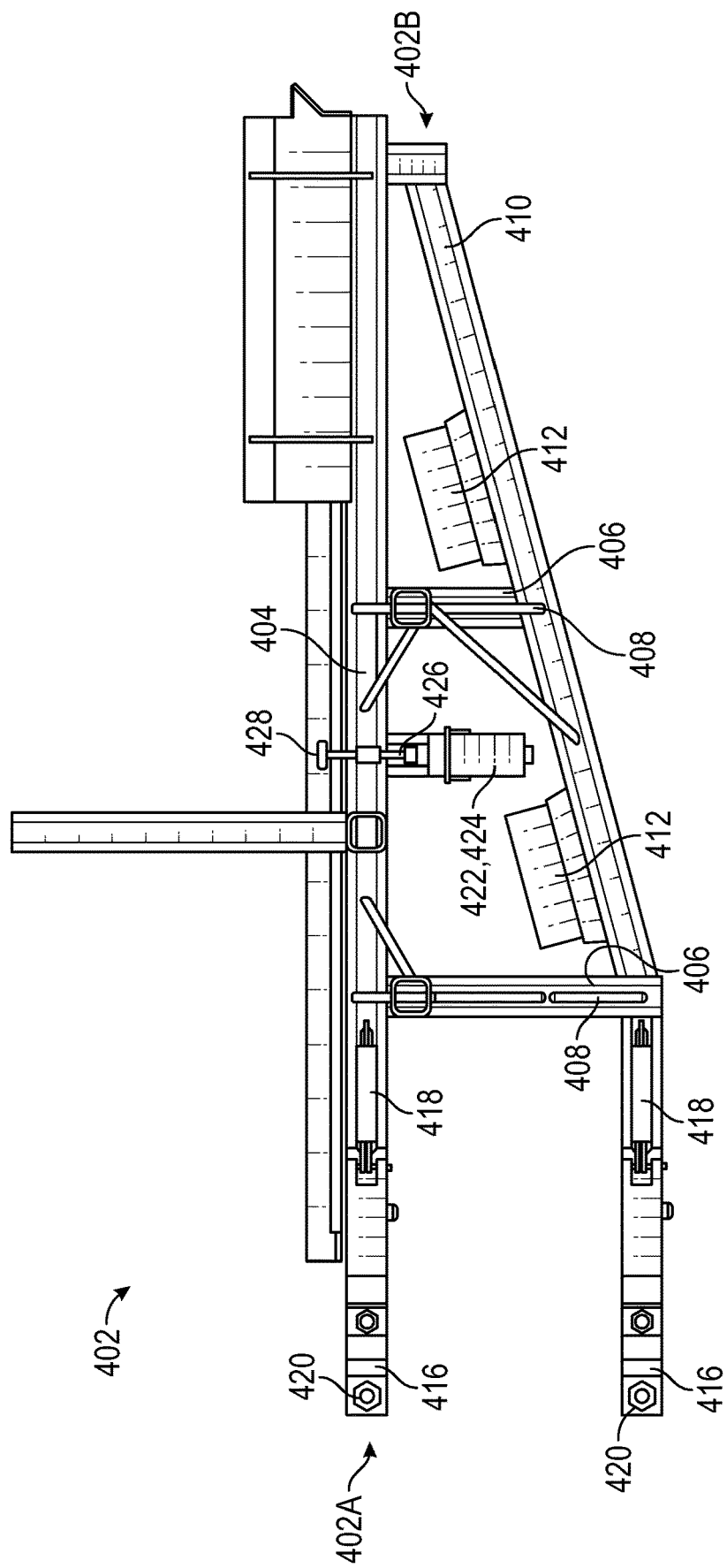
FIG. 19 is a side view of the landing structure of FIG. 18.
Figure 20:
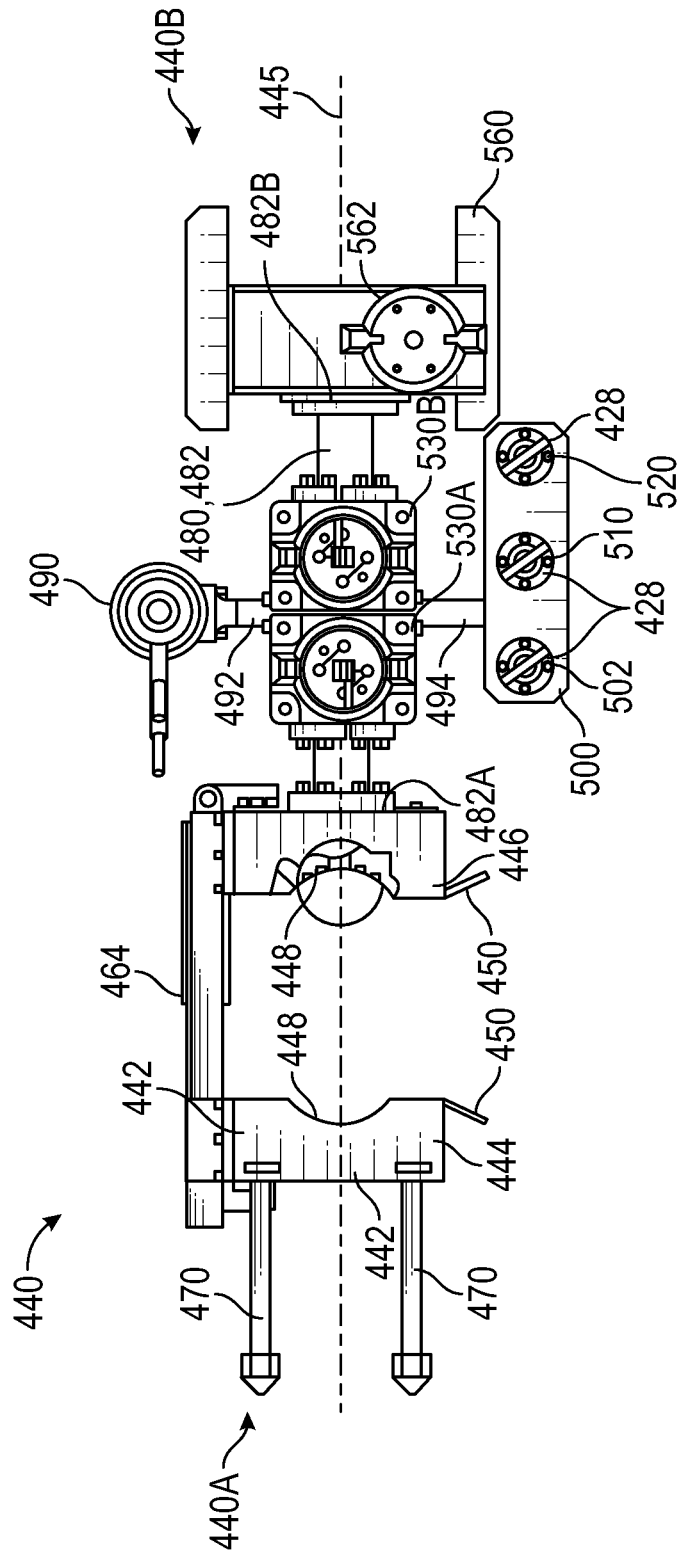
FIG. 20 is a top view of the clamp assembly of the hot tap of FIG. 15 in an open position.
Figure 21:
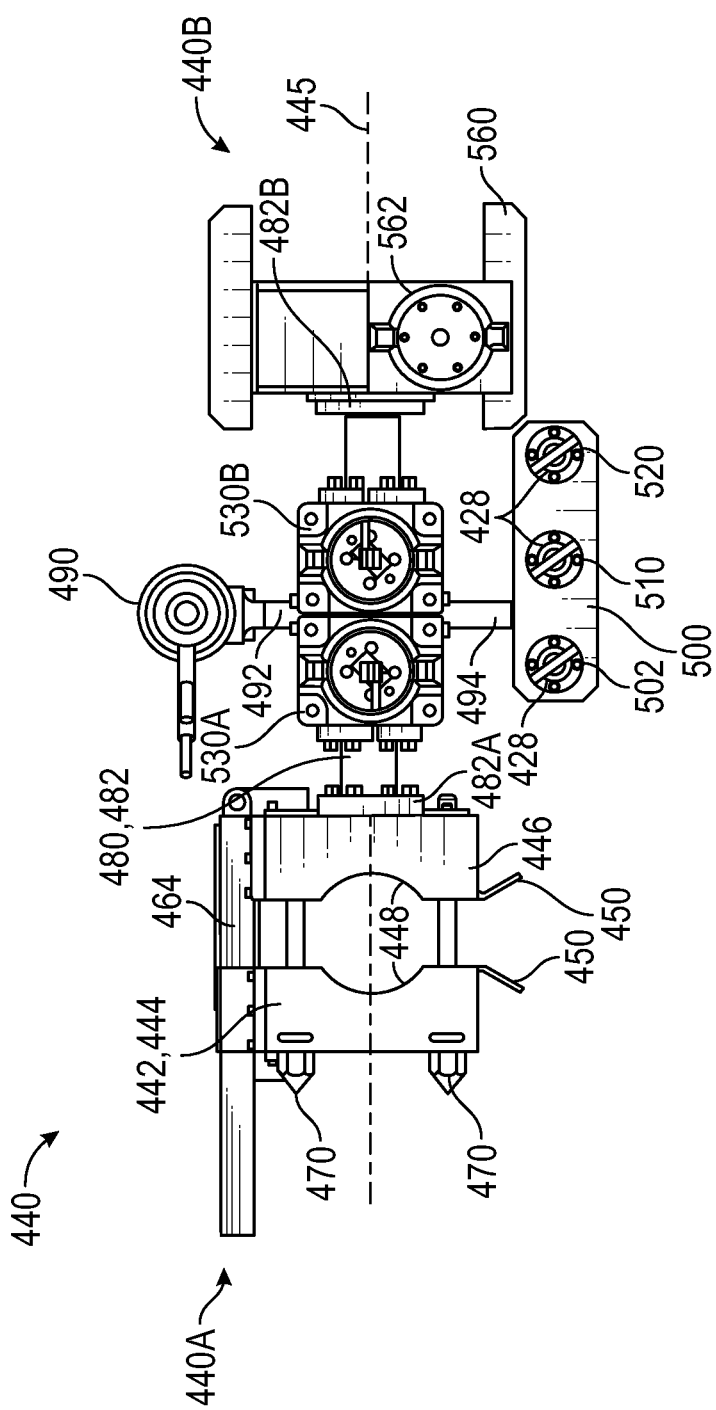
FIG. 21 is a top view of the clamp assembly of FIG. 20 in a closed position.
Figure 22:
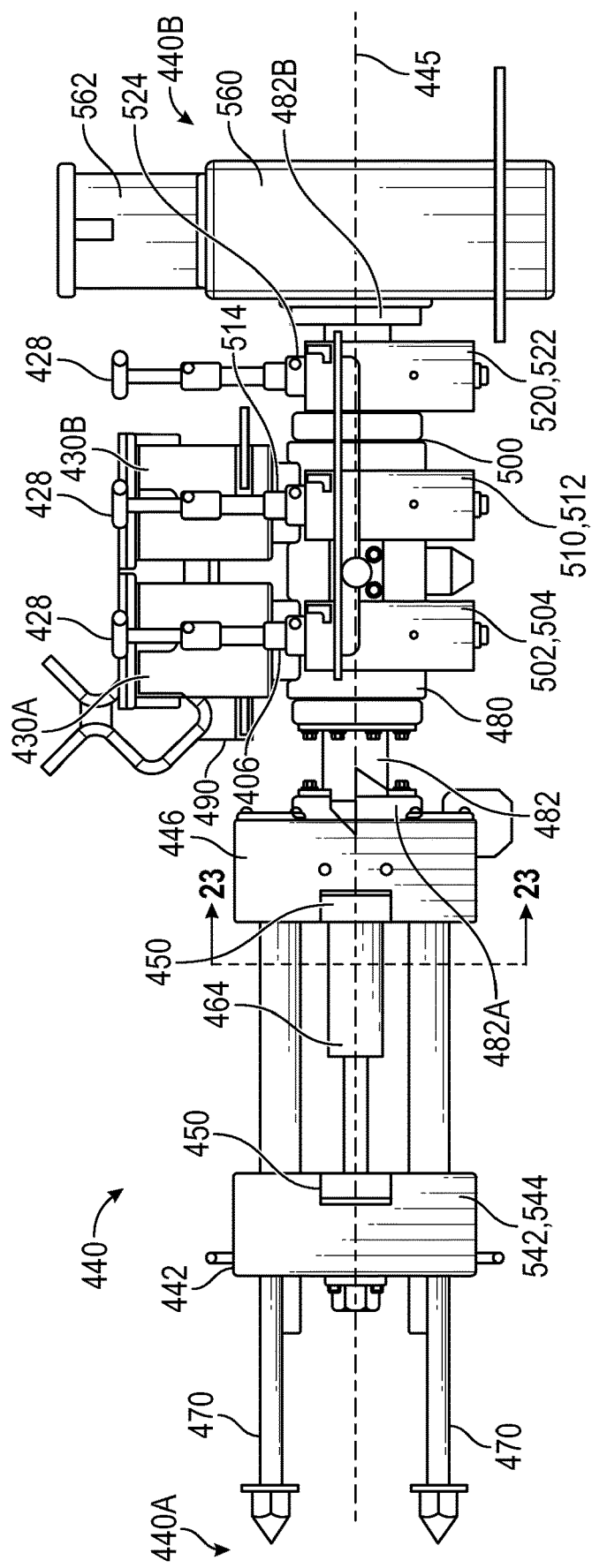
FIG. 22 is a side view of the clamp assembly of FIG. 20.
Figure 23:
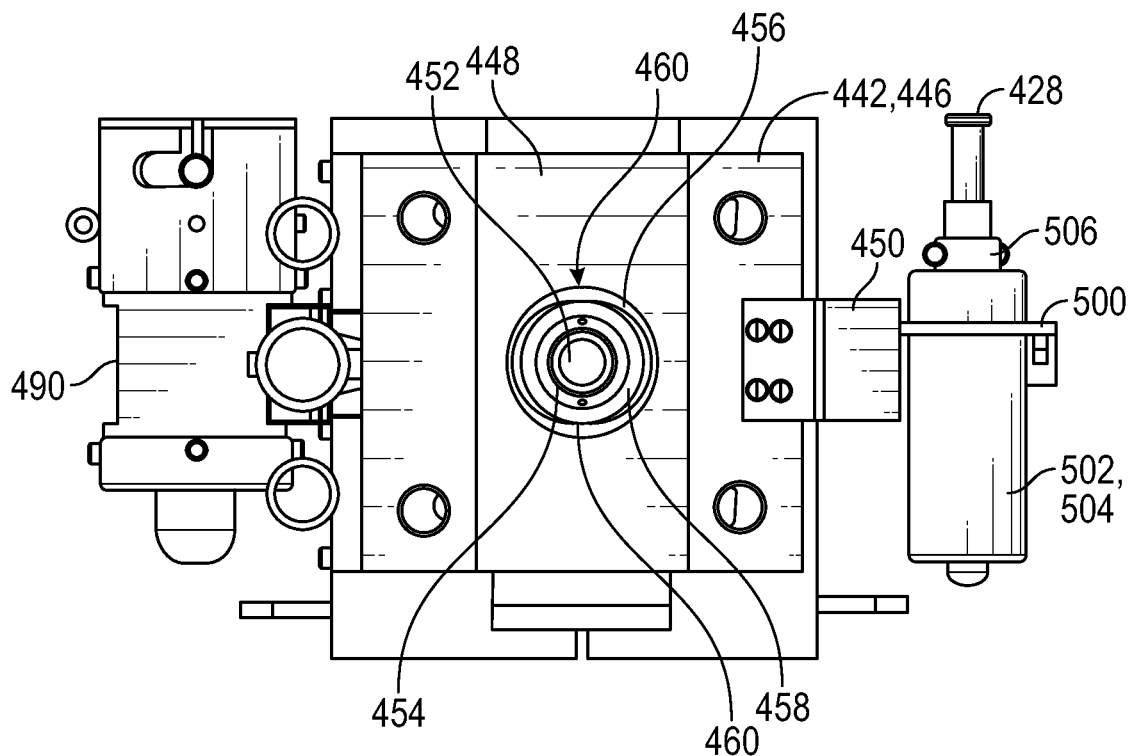
FIG. 23 is a cross-sectional view of the clamp assembly of FIG. 20 taken along section 23-23 of FIG. 22.
Figure 29:
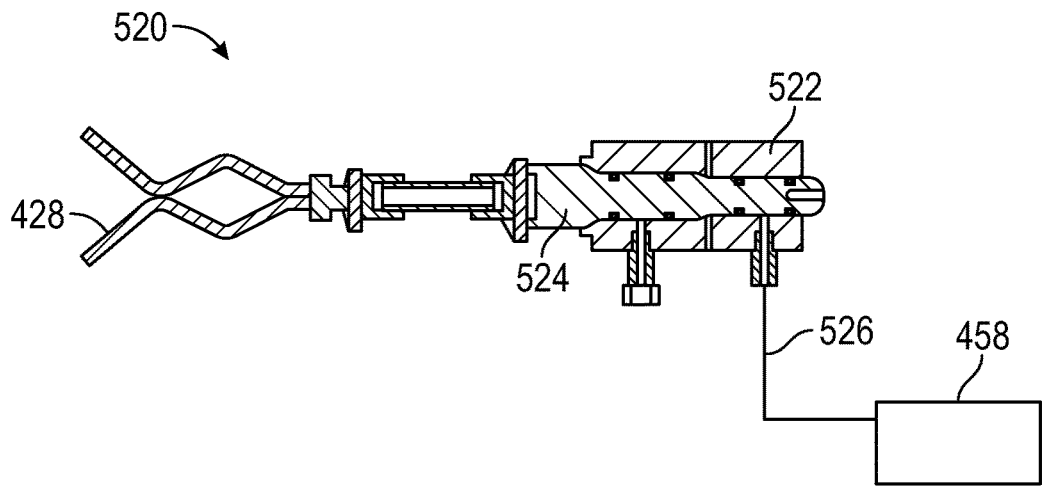

In this embodiment, landing structure 402 is separable from clamp assembly 440 and drill assembly 600. As will be described in more detail below, landing structure 402 may be transported separately to and installed on a subsea component of subsea fluid system 30 prior to transporting and/or coupling clamp assembly 440 and drill assembly 600 to landing structure 402. As best shown in FIGS. 18, 19, and 29, landing structure 402 has a first or inner end 402A and a second or outer end 402B opposite inner end 402A. Inner end 402A of landing structure 402 is positioned directly adjacent jumper 50 of subsea fluid system 30 when hot tap 400 is coupled with jumper 50 while outer end 402B is positioned distal jumper 50. In this embodiment, landing structure 402 generally includes a first or upper support arm 404 and a second or lower support arm 410. Support arms 402, 410 are joined at the outer end 402B of landing structure 402 and are vertically spaced apart at inner end 402A.

Lower support arm 410 extends along a central or longitudinal axis oriented at a non-zero, acute angle relative to a central or longitudinal axis of upper support arm 404. A plurality of laterally spaced cross-supports 406 extend vertically between upper support arm 404 and lower support arm 410 for transferring loads between arms 402, 410. In this embodiment, each cross-support 406 includes a ROV handle to assist ROV 200 with deploying and manipulating hot tap 400. Additionally, in this embodiment, a plurality of sacrificial anodes 412 are coupled to lower support arm 400 to protect hot tap 400 from galvanic corrosion during subsea operations.

Figure 26:
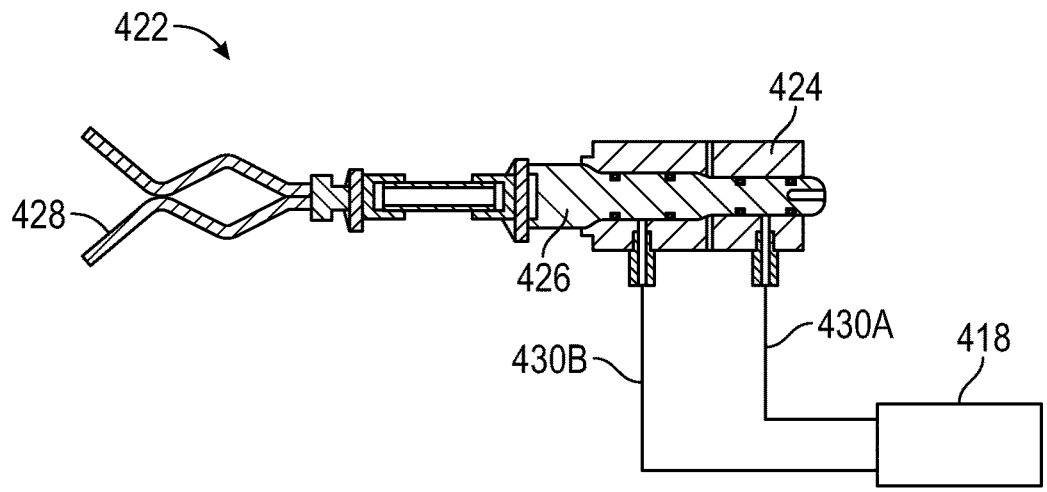
FIG. 26 is a schematic cross-sectional view of an embodiment of a hot stab of the landing structure of FIG. 18 in accordance with principles disclosed herein.
Figure 27:
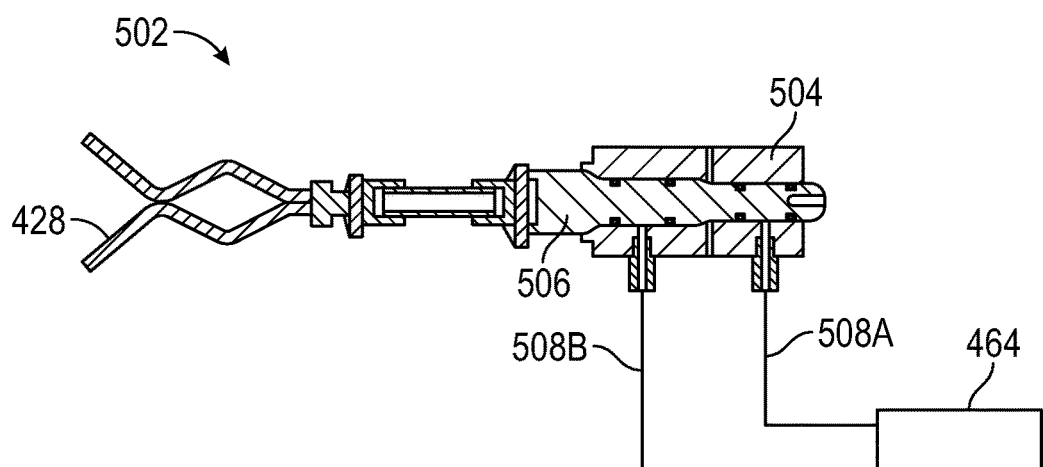
FIGS. 27-29 are schematic cross-sectional views of embodiments of the hot stabs of the clamp assembly of FIG. 20 in accordance with principles disclosed herein.
Figure 28:
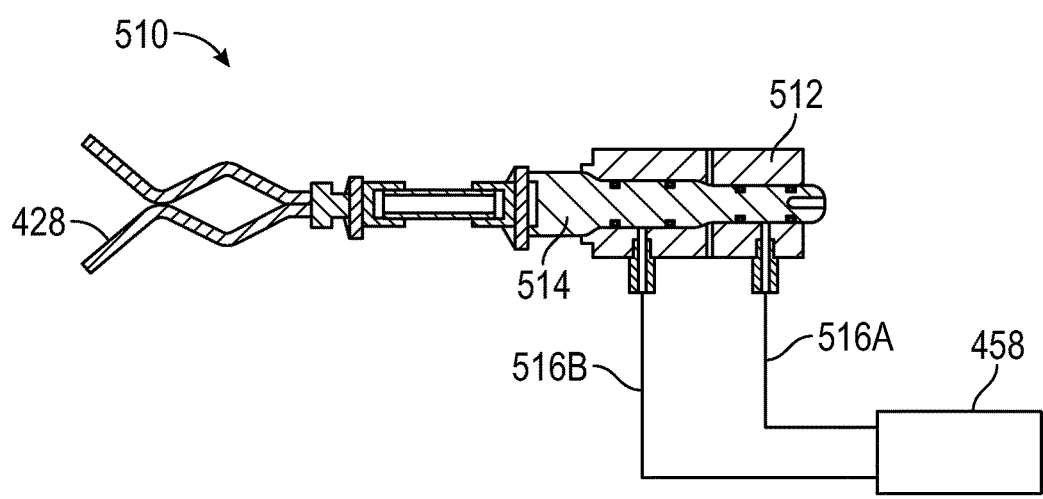

Referring still to FIGS. 18 and 19, a support jaw or clamp 416 is pivotably coupled to each support arm 404, 410 at the inner end 402A of landing structure 402. A first clamp actuator 418 is coupled between a first support clamp 416 and the upper support arm 404 and a second clamp actuator 418 is coupled between a second support clamp 416 and the lower support arm 410. Clamp actuators 418 actuate support clamps 416 between a first or open position and a second or closed position (shown in FIGS. 18, 19). Additionally, in this embodiment, each support clamp 416 includes a lock or fastener 420 for locking support clamps 416 in the closed position once landing structure 402 has been coupled to a subsea component of subsea fluid system 30. When support clamps 416 are in the open position, a subsea component of subsea fluid system 30 may be inserted into support clamps 416. Conversely, when support clamps 416 are in the closed position, landing structure 402 is secured to and locked on to the subsea component disposed between support clamps 416, thereby restricting and/or preventing relative movement between landing structure 402 and the subsea component. Additionally, with support clamps 416 disposed in the closed position, loads applied to landing structure 402 (e.g., loads applied to structure 402 from clamp assembly 440 and/or drill assembly 600) are transferred to the subsea component to which landing structure 402 is attached Landing structure 402 of hot tap 400 also includes a support structure hot stab 422 coupled to lower support arm 410. Hot stab 422 interfaces with ROV 200 such that ROV 200 may selectably actuate support clamps 416 between their open and closed positions via clamp actuators 418. As shown particularly in FIG. 26, hot stab 422 includes an outer receptacle 424 which receives a ported valve 426 therein. Valve 426 of support structure hot stab 422 includes a handle 428 that may be manipulated by an arm 122 of ROV 200. Support structure hot stab 422 includes a first or clamp open flowpath 430A and a second or clamp closed flowpath 430B. Each support clamp 416 may be actuated into the open position in response to ROV 200 pressurizing clamp open flowpath 430A. Conversely, each support clamp 416 may be actuated into the closed position in response to ROV 200 pressurizing clamp closed flowpath 430B.

As shown in FIGS. 15-17, 19-24, clamp assembly 440 of hot tap 400 has a first or inner end 440A, a second or outer end 440B opposite inner end 440A, and a central or longitudinal axis 445 extending from the inner end 440A to the outer end 440B. Inner end 440A of clamp assembly 440 is positioned directly adjacent jumper 50 of subsea fluid system 30 when hot tap 400 is coupled with jumper 50 while outer end 440B is positioned distal jumper 50. Clamp assembly 440 is attached to and physically supported by the upper support arm 404 of landing structure 402.

In this embodiment, clamp assembly 440 generally includes a hot tap clamp 442, a hot tap manifold 480, and a drill clamp 560. Hot tap clamp 442 is positioned at the inner end 440A of clamp assembly 440 and is configured to clamp against a subsea fluid conduit (e.g., jumper 50) of subsea fluid system 30. In this embodiment, hot tap clamp 442 generally includes a first jaw 444, a second, opposing jaw 446, a hot tap clamp actuator 464, and a plurality of hot tap clamp fasteners or locks 470. Each jaw 444, 446 of hot tap clamp 442 comprises an arcuate or semi-cylindrical engagement surface 448. Additionally, each jaw 444, 446 includes a guide 450 extending laterally from jaws 444, 446. Guides 450 are positioned on a lateral side of hot tap clamp 442 opposite hot tap clamp actuator 464 and are configured to guide hot tap clamp 442 into position about a subsea fluid conduit of subsea fluid system 30.

Figure 24:
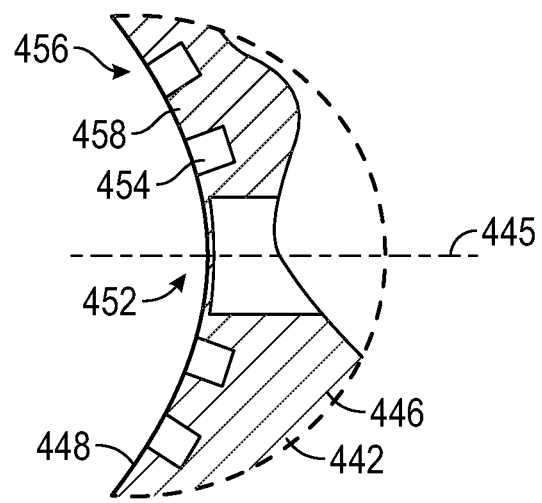
FIG. 24 is an enlarged cross-sectional view a portion of an embodiment of a jaw of the clamp assembly of FIG. 20 according to principles disclosed herein.

As best shown in FIG. 24, hot tap clamp 442 includes a central passage 452 that extends along central axis 445 and through the engagement surface 448 of second jaw 446. As will be discussed further herein, central passage 452 of second jaw 446 is in fluid communication with hot tap manifold 480. In some embodiments, the injection flowpath 250 shown in FIG. 4 may extend through central passage 452 of hot tap clamp 442 and central passage 452 may comprise the first port 207 of hot tap 205. In some embodiments, the injection flowpath 361 shown in FIG. 10 may extend through central passage 452 of hot tap clamp 442.

Additionally, an annular first or inner seal assembly 454 and an annular, second or outer seal assembly 456 are positioned on the engagement surface 448 of second jaw 446. Both inner seal assembly 454 and outer seal assembly 456 extend concentrically about the central axis 445 of clamp assembly 440 and entirely encircle central passage 452. Seal assemblies 454, 456 are each configured to seal along only a portion of the circumference of the subsea fluid conduit to which clamp assembly 440 is coupled, and thus clamp assembly 440 is not subjected to the hoop stresses subjected to conventional hot tap assemblies which seal about the entire circumference of the subsea fluid conduit to which they are coupled. In this manner, seal assemblies 454, 456 may seal relatively high pressure fluids within central passage 452 and annulus 458, such as fluids having pressures of approximately between 6,000 pounds PSI and 10,000 PSI.

Further, outer seal assembly 456 entirely encircles inner seal assembly 454 such that an annular surface or annulus 458 is formed between seal assemblies 454, 456. As will be discussed further herein, when hot tap 400 is clamped to a subsea fluid conduit of subsea fluid system 30, seal assemblies 454, 456 act to seal annulus 458 from both central passage 452 and the surrounding subsea environment. In this embodiment, a pair of circumferentially spaced ports 460 extend through the engagement surface 448 of second jaw 446. Each port 460 is radially offset from the central axis 445 of clamp assembly 440 and is positioned radially between inner seal assembly 454 and outer seal assembly 456. In this configuration, ports 460 are in fluid communication with annulus 458 but are sealed from central passage 452 and the surrounding subsea environment when hot tap 400 is coupled to a subsea fluid conduit of subsea fluid system 30. Although in this embodiment second jaw 446 comprises a pair of ports 460, in other embodiments, the number of ports 460 may vary.

In some embodiments, at least one of the ports 460 of second jaw 446 may comprise the second port 209 of the hot stab 205 shown in FIGS. 2-6 and at least a portion of the return flowpath 252 shown in FIG. 4 may extend through one of the ports 460. Additionally, in some embodiments, at least a portion of the return flowpath 363 shown in FIG. 10 may extend through one or more of the ports 460. Alternatively, with each hot tap 250A, 250B comprising a hot tap 400, the injection flowpath 361 may extend through the central passage 452 of second hot tap 205B while the return flowpath 363 may extend through the central passage 452 of first hot tap 205A.

In this embodiment, hot tap clamp actuator 464 is laterally offset from, and extends parallel with, the central axis 445 of clamp assembly 440. Hot tap clamp actuator 464 selectably actuates hot tap clamp 442 between a first or open position (shown in FIG. 20) and a second or closed position (shown in FIG. 21) by displacing first jaw 444 along central axis 445 towards the outer end 440B of clamp assembly 440. When hot tap clamp 442 in the open position, a subsea fluid conduit of subsea fluid system 30 may be inserted into hot tap clamp 442 between the engagement surfaces 448 of jaws 444, 446. Conversely, when hot tap clamp 442 is in the closed position, clamp assembly 440 is locked to the subsea fluid conduit extending through hot tap clamp 442, restricting relative movement between clamp assembly 440 and the subsea fluid conduit. Additionally, when hot tap clamp 442 is in the closed position, an outer surface of the subsea fluid conduit engaged by clamp assembly 440 is engaged or contacted by the engagement surface 448 of each jaw 444, 446 of hot tap clamp 442. In this embodiment, hot tap clamp locks 470 lock hot tap clamp 442 in the closed position with the subsea fluid conduit engaged by the engagement surfaces 448 of jaws 444, 446.

As shown particularly in FIGS. 15-17, 20-24, the hot tap manifold 480 of clamp assembly 440 is configured to selectably route fluids and/or tools to the central passage 452 of the second jaw 446 of hot tap clamp 442. In this embodiment, hot tap manifold 480 generally includes a central conduit or cylinder 482, a hot stab connector 490, and a clamp ROV panel 500. Central conduit 482 extends coaxially with central axis 445 of clamp assembly 440 and includes a first or inner end 482A coupled to the second jaw 446 of hot tap clamp 442 and a second or outer end 482B, opposite inner end 482A, which is coupled to drill clamp 560. Central conduit 482 includes an internal passage in fluid communication with central passage 452 of the second jaw 446 of hot tap clamp 442.

Hot stab connector 490 provides an interface through which materials (e.g., fluid and/or tools) may be transported to the central passage 452 of the second jaw 446 of hot tap clamp 442. For example, ROV 200 may connect with hot stab connector 490 to transport materials between ROV 200 and central passage 452 of hot tap clamp 442. Similarly, coil tubing 104 may connect with hot stab connector 490 to transport materials between coil tubing 104 and central passage 452. In this embodiment, hot stab connector 490 of hot tap manifold 480 is connected to central conduit 482 via a first branch conduit 492 that extends laterally from central conduit 482 to hot stab connector 490. In this configuration, an internal passage of first branch conduit 492 is in selective fluid communication with the central passage 452 of hot tap clamp 442.

ROV panel 500 of hot tap manifold 480 is connected to central conduit 482 via a second branch conduit 494 that extends laterally from central conduit 482 to ROV panel 500. In this embodiment, ROV panel 500 of hot tap manifold 480 includes a clamp hot stab 502, an annulus flush hot stab 510, and an annulus test hot stab 520. Hot stabs 502, 510, and 520 include features in common with support structure hot stab 422, and shared features are labeled similarly. As shown particularly in FIGS. 20-22 and 27, clamp hot stab 502 includes an outer receptacle 504 which receives a ported valve 506 therein. Clamp hot stab 502 includes a first or clamp open flowpath 508A and a second or clamp closed flowpath 508B. Hot tap clamp actuator 464 may be actuated in a first direction to thereby actuate hot tap clamp 442 into the open position (shown in FIG. 20) in response to ROV 200 pressurizing clamp open flowpath 508A. Hot tap clamp actuator 464 may be actuated in a second direction to thereby actuate hot tap clamp 442 into the closed position (shown in FIG. 21) in response to ROV 200 pressurizing clamp closed flowpath 508B.

As shown particularly in FIGS. 20-22 and 28, annulus flush hot stab 510 includes an outer receptacle 512 which receives a ported valve 514 therein. Annulus flush hot stab 510 includes a first or injection flowpath 516A that is in fluid communication with a first port 460 of the pair of ports 460 and a second or return flowpath 516B in fluid communication with a second port 460 of the pair of ports 460. As will be described further herein, fluid may be supplied to annulus 458 of hot tap clamp 442 via the injection flowpath 516A, and the fluid supplied to annulus 458 may be returned to annulus flush hot stab 510 via return flowpath 516A. Thus, annulus flush hot stab 510 provides for the flushing of annulus 458 via the circulation of fluid between annulus flush hot stab 510 and annulus 458.

As shown particularly in FIGS. 20-22 and 29, annulus test hot stab 520 includes an outer receptacle 522 which receives a ported valve 524 therein. Annulus test hot stab 520 includes a single annulus test flowpath 526 that is in fluid communication with at least one of the ports 460 of the second jaw 446 of hot tap clamp 442. As will be described further herein, with hot tap 400 coupled to a subsea fluid conduit of subsea fluid system 30, pressurized fluid may be supplied to annulus 458 of hot tap clamp 442 via the test flowpath 526 of annulus test hot stab 520. By pressurizing annulus 458, the sealing integrity between the outer surface of the subsea fluid conduit and both the inner seal assembly 454 and the outer seal assembly 456 of hot tap clamp 442 may be tested prior to drilling of the subsea fluid conduit by drill assembly 580.

In this embodiment, hot stab manifold 480 also includes a pair of ROV actuatable isolation valves 530A, 530B coupled to and extending from central conduit 482. A first isolation valve 530A of the pair of isolation valves 530A, 530B is configured to selectably isolate or seal the central passage 452 of hot tap clamp 442 and hot stab connector 490. In this configuration, first isolation valve 530A is positioned fluidically between central passage 452 and hot stab connector 490. A second isolation valve 530B of the pair of isolation valves 530A, 530B is configured to selectably isolate or seal hot stab connector 490 from drill assembly 600. In this configuration, second isolation valve 530B is positioned fluidically between drill assembly 600 and hot stab connector 490. Additionally, each of the pair of isolation valves 530A, 530B is positioned fluidically between central passage 452 of hot tap clamp 442 and drill assembly 600. Thus, when ROV 200 actuates each isolation valve 530A, 530B into a closed position, a dual seal barrier is provided between central passage 452 of hot tap clamp 442 and drill assembly 600.

In this embodiment, drill clamp 560 of clamp assembly 440 is coupled to the outer end 482B of the central conduit 482 of hot tap manifold 480. Drill clamp 560 includes an internal passage in fluid communication with the internal passage of the central conduit 482 of hot tap manifold 480. Drill clamp 560 includes a first or open position that permits drill assembly 600 to couple with and decouple from clamp assembly 440, and a second or closed position which locks drill assembly 600 with clamp assembly 440. Drill clamp 560 includes an ROV controllable valve or actuator 562 that actuates drill clamp 560 between the open and closed positions. In this embodiment, isolation valves 530A, 530B and drill clamp actuator 562 each comprise ROV torque buckets; however, in other embodiments, valves 530A, 530B and actuator 562 may comprise other ROV controllable devices.

Figure 25:
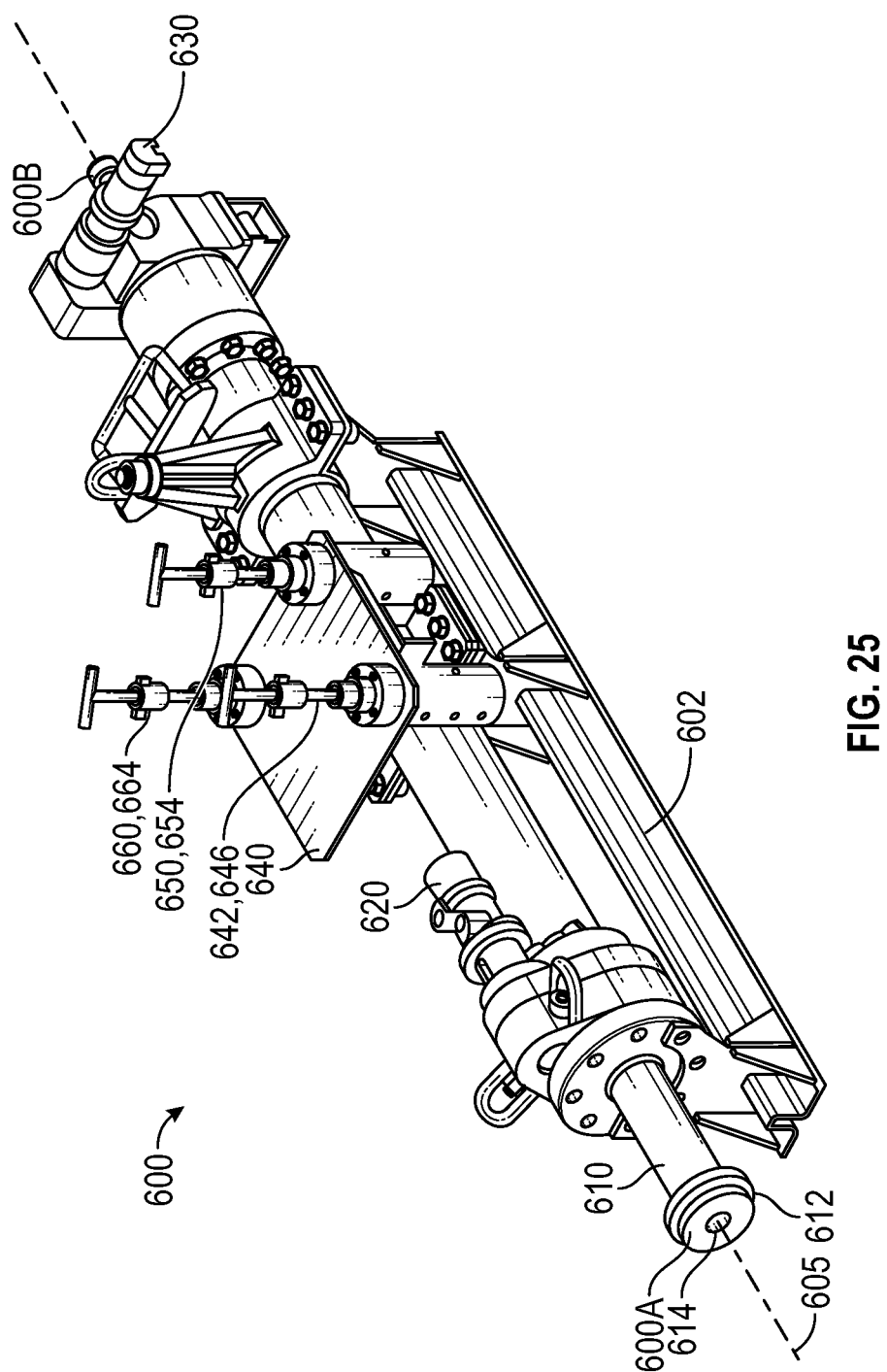
FIG. 25 is a perspective view of the drill assembly of the hot tap of FIG. 15.

As shown particularly in FIG. 25, drill assembly 600 of hot tap 400 has a first or inner end 600A, a second or outer end 600B opposite inner end 600A, and a central or longitudinal axis 605 extending from the inner end 600A to the outer end 600B. The inner end 600A of drill assembly 600 is configured to releasably couple with clamp assembly 440 via drill clamp 560 while outer end 600B is positioned opposite the subsea fluid conduit of subsea fluid system 30 to which hot tap 400 is coupled during operation. Additionally, the central axis 605 of drill assembly 600 is positioned coaxially with central axis 445 of clamp assembly 440 when drill assembly 600 is coupled with clamp assembly 440.

In this embodiment, drill assembly 600 generally includes a landing or support guide 602, a central conduit or cylinder 610, a drill motor 620, a feed motor 630, and a drill ROV panel 640. Central conduit 610 of drill assembly 600 extends from inner end 600A to outer end 600B and includes a connector hub 612 positioned at inner end 600A for coupling with the drill clamp 560 of clamp assembly 440. Additionally, central conduit 610 includes a central passage 614 extending therethrough that receives a drill rotatably disposed therein. Central passage 614 extends coaxially with the central axis 605 of drill assembly 600. As will be described further herein, the drill housed in central conduit 610 is configured to tap or penetrate an external or outer cylindrical surface of one or more subsea fluid conduits (e.g., jumper 50) to establish fluid communication between the penetrated subsea fluid conduit and the internal passage of hot tap manifold 480.

Support guide 602 of drill assembly 600 is coupled to central conduit 610 and is configured to interface between the upper support arm 404 of landing structure 402 and central conduit 610 such that loads applied to drill assembly 600 are transferred to landing structure 402. Drill motor 620 and feed motor 630 of drill assembly 600 are each coupled to central conduit 610. Drill motor 620 selectably applies a desired amount of rotational torque to the drill housed in central conduit 610 while feed motor 630 controls the rate of longitudinal displacement of the drill through central passage 614 of central conduit 610 along central axis 605 of drill assembly 600.

Figure 30:
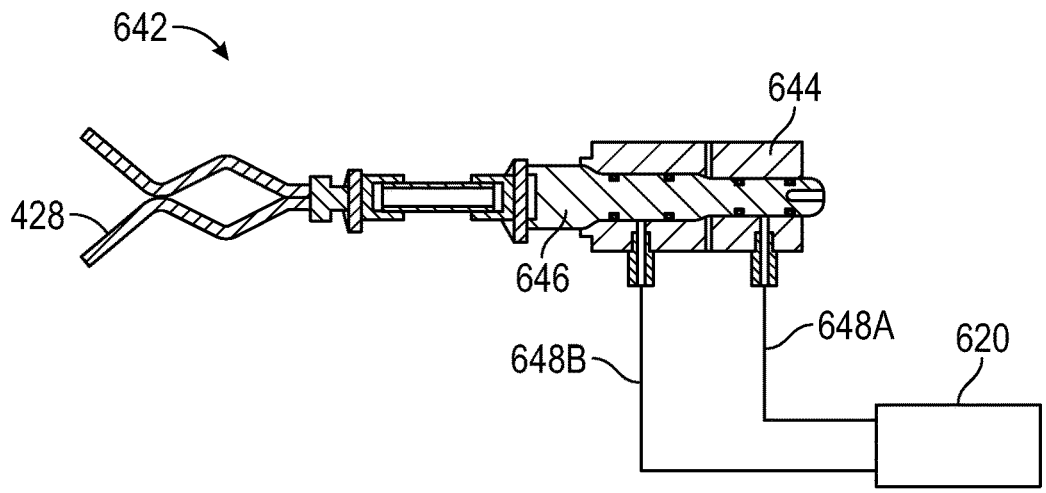
FIGS. 30-32 are schematic cross-sectional views of embodiments of the hot stabs of the drill assembly of FIG. 25 in accordance with principles disclosed herein.

In this embodiment, ROV panel 640 of drill assembly 600 includes a drill hot stab 642, a feed hot stab 650, and a drill flush hot stab 660. Hot stabs 642, 650, and 660 include features in common with hot stabs 422, 502, 510, and 520, and shared features are labeled similarly. As shown particularly in FIGS. 25 and 30, drill hot stab 642 includes an outer receptacle 644 which receives a ported valve 646 therein. Drill hot stab 642 includes a pair of flowpaths 648A, 648B in fluid communication with drill motor 620 and configured for controlling the rotational rate and torque outputted by drill motor 620 to the drill housed in the central conduit 610 of drill assembly 600.

Figure 31:
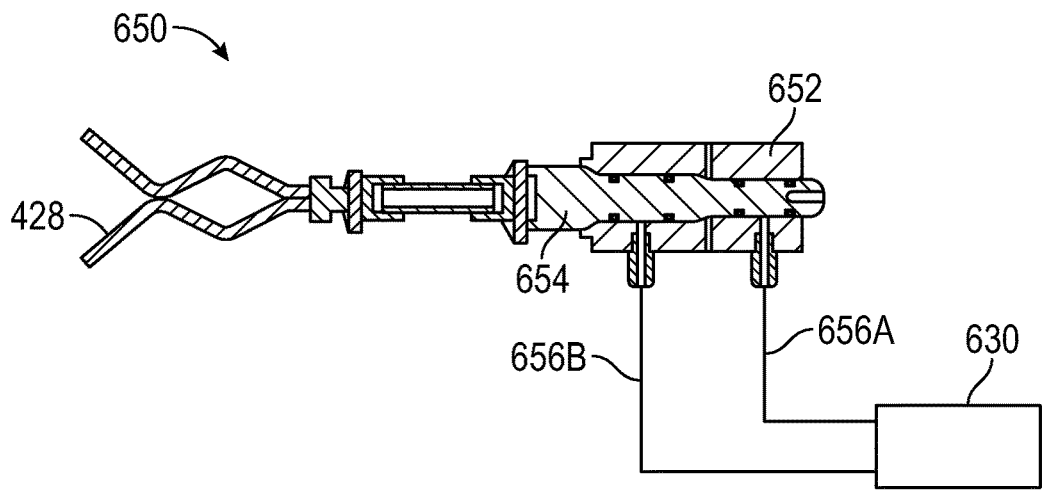
Figure 32:
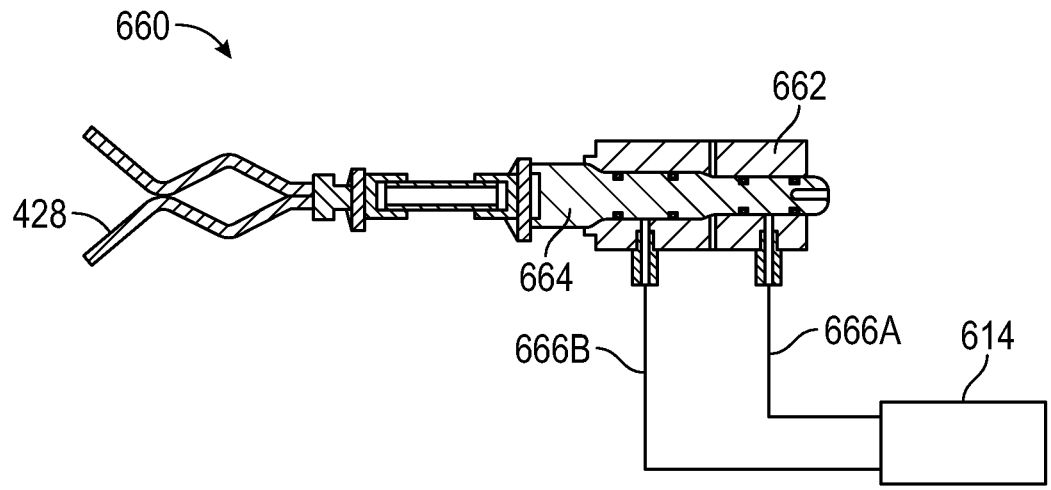

As shown particularly in FIGS. 25 and 31, feed hot stab 650 includes an outer receptacle 652 which receives a ported valve 654 therein. Feed hot stab 650 includes a pair of flowpaths 656A, 656B in fluid communication with feed motor 630 and configured for controlling the longitudinal position and rate of longitudinal movement along central axis 605 of the drill housed in the central conduit 610 of drill assembly 600. As shown particularly in FIGS. 25 and 32, drill flush hot stab 660 includes an outer receptacle 662 which receives a ported valve 664 therein. Drill flush hot stab 660 includes a first or injection flowpath 666A and a second or return flowpath 666B, each of which are in fluid communication with the central passage 614 of the central conduit 610 of drill assembly 600. As will be described further herein, fluid may be supplied to central passage 614 of central conduit 610 via the injection flowpath 666A, and the fluid supplied to central passage 614 may be returned to drill flush hot stab 660 via return flowpath 666A. Thus, drill flush hot stab 660 provides for the flushing of the central passage 614 of central conduit 610 via the circulation of fluid between drill flush hot stab 660 and central passage 614.

As described above with respect to hot stabs 205 and 205A, 205B, once deployed at subsea fluid system 30, ROV 200 may install hot tap 400 onto jumper 50 of subsea fluid system 30 at one of the connector hubs 46 of second subsea terminals 40, 42. In some embodiments, landing structure 402 may be separately transported to the subsea fluid system 30 prior to transporting clamp assembly 440 and drill assembly 600.

Particularly, with support clamps 416 each in the open position, ROV 200 guides landing structure 402 into position adjacent jumper 50. ROV 200 then positions landing structure 402 such that the cylindrical jumper 50 is inserted into the open support clamps 416 of landing structure 402. With jumper 50 inserted into the open support clamps 416, ROV 200 operates support structure 422 to actuate support clamps 416 into the closed position, thereby locking landing structure 402 of hot tap 400 to the jumper 50 of subsea fluid system 30 at the connector hub 44 of second subsea terminal 42. In this configuration, loads applied to support structure 422 are transferred to jumper 50 and second subsea terminal 42. Thus, hot stab assembly 400 is light enough such that the entire weight of hot stab assembly 400 may be supported by jumper 50 and the subsea components of subsea fluid system 30 coupled thereto. In other words, hot stab assembly 400 need not be directly supported by the seabed 5 and instead may be vertically spaced from the seabed 5. Thus, hot tap 400 may be coupled to subsea fluid conduits which are positioned vertically above the seabed 5, increasing the flexibility of hot tap 400 for forming isolated fluidic connections with components of subsea fluid system 30.

With landing structure 402 attached to jumper 50 of subsea fluid system 30, ROV 200 retrieves clamp assembly 440 from surface vessel 102. In this embodiment, prior to retrieving clamp assembly 440, hot tap clamp 442 and drill clamp 560 are actuated into the open position, and isolation valves 530A, 530B are each actuated into the open position. ROV 200 positions clamp assembly 440 on the upper support arm 404 of landing structure 402 such that jumper 50 is received in the open hot tap clamp 442 of clamp assembly 440. ROV 200 then operates clamp hot stab 502 to actuate hot tap clamp 442 into the closed position such that the outer surface of jumper 50 is engaged or contacted by the engagement surfaces 448 of the jaws 444, 446 of hot tap clamp 442. Additionally, with hot tap clamp 442 in the closed position, seal assemblies 454, and 456 of second jaw 446 each sealingly engage the outer surface of jumper 50, thereby sealing central passage 452 and annulus 458 of second jaw 446 from the surrounding subsea environment.

With clamp assembly 440 positioned on landing structure 402 and clamped to jumper 50, ROV 200 retrieves drill assembly 600 of hot tap 400 from surface vessel 102 and positions drill assembly 600 on the upper support arm 404 of landing structure 402 adjacent clamp assembly 440. In some embodiments, the internal passage of central conduit 482 and the central passage 452 of clamp assembly 440 are tested prior to landing drill assembly 600 on support structure 402. For example, the seal formed between inner seal assembly 454 and the outer surface of jumper 50 may be tested by pressurizing the internal passage of central conduit 482 via hot stab connector 490.

ROV 200 inserts the connector hub 612 of the central conduit 610 of drill assembly 600 into the open drill clamp 560 of clamp assembly 440. Once connector hub 612 is inserted into drill clamp 560, ROV 200 operates drill clamp actuator 562 to actuate drill clamp 560 into the closed position, thereby locking drill assembly 600 to the clamp assembly 440. Additionally, with drill clamp 560 in the closed position, central passage 614 of the central conduit 610 of drill assembly 600 is in fluid communication with the internal passage of the central conduit 482 of hot tap manifold 480, and both central passage 614 and the internal passage of central conduit 482 are sealed from the surrounding subsea environment. Although in this embodiment landing structure 402, clamp assembly 440, and drill assembly 600 are each separately transported to subsea fluid system 30, in other embodiments, assemblies 440, 600 may be preassembled with landing structure 402 at surface vessel 102 prior to being transported to subsea fluid system 30.

In some embodiments, with drill assembly 600 locked to clamp assembly 440, annulus 458 is flushed and the integrity of the seal formed between seal assemblies 454, 456 and jumper 50 is tested by ROV 200. Specifically, ROV 200 operates annulus flush hot stab 510 to circulate a flushing fluid from annulus flush hot stab 510 to a first port 460 of the second jaw 446 of hot tap clamp 442 via injection flowpath 516A. The flushing fluid then circulates through annulus 458 and returns to annulus flush hot stab 510 via a second port 460 and return flowpath 516B. Once annulus 458 has been sufficiently flushed using annulus flush stab 510, the integrity of the seals formed between seal assemblies 454, 456 and the outer surface of jumper 50 is tested. Particularly, ROV 200 operates annulus test hot stab 520 to pressurize annulus test flowpath 526 and annulus 458 which is in fluid communication therewith. Fluid pressure in annulus 458 may be monitored at the surface vessel 102 to confirm the formation of a seal between the inner seal assembly 454 and jumper 50, and between outer seal assembly 456 and jumper 50.

Following the flushing and pressure testing of annulus 458, ROV 200 may fluidically connect a hot tap fluid conduit or jumper to the hot stab connector 490 of hot tap 400. With isolation valves 530A, 530B each disposed in the open position, ROV 200 operates drill hot stab 642 and feed hot stab 650 to rotate the drill housed in the central passage 614 of central conduit 610 and to advance the drill from a first or original position through the internal passage of the central conduit 482 of hot tap manifold 480. The drill advances through the internal passage of central conduit 482, contacting and penetrating jumper 50 of subsea fluid system 30 such that fluid communication is established between jumper 50 and the internal passage of central conduit 482. Once jumper 50 has been successfully penetrated or tapped by the drill of drill assembly 600, ROV 200 operates feed hot stab 650 to retract the drill to its original position within central passage 614 of central conduit 610. The perforation formed in jumper 50 is sealed from the surrounding subsea environment by the sealing engagement formed between seal assemblies 454, 456 and the outer surface of jumper 50, where each seal assembly 454, 456 extends entirely around the perforation formed in jumper 50.

Following the return of the drill to its original position, ROV 200 closes the second isolation valve 530B to fluidically isolate central passage 614 of central conduit 610 from hot stab connector 490 and jumper 50. In this embodiment, following the closure of second isolation valve 530B, ROV 200 operates drill flush hot stab 660 to circulate a flushing fluid through the central passage 614 of central conduit 610 to flush any debris or other materials or fluids released during the drilling of jumper 50. In some embodiments, following the flushing of the central passage 614 of central conduit 610, ROV 200 operates drill clamp actuator 562 to actuate drill clamp 560 into the open position whereby drill assembly 600 may be transported to surface vessel 102. In certain embodiments, following the retrieval of drill assembly 600, one or more ROV caps are installed at the hot tap 400 to complete the installation of hot tap 400 on the subsea fluid conduit.

In some embodiments, during a remediation operation performed using hot tap 400, annulus 458 may be used as a mold for forming an additional seal about the perforation formed in jumper 50 in the event of a failure of one or both of seal assemblies 454, 456. Particularly, ROV 200 may be operated to fill annulus 458 with a sealing material (e.g., an epoxy, etc.) configured to form a seal between annulus 458 and the outer surface of jumper 50. Once one or more of the blockages 70, 72, and 74 have been remediated by intervention system 100, ROV 200 retrieves the clamp assembly 440 and landing structure 402 to the surface vessel 102 by operating hot stabs 422, 502 to open support clamps 416 and hot tap clamp 442, respectively.

Figure 33:
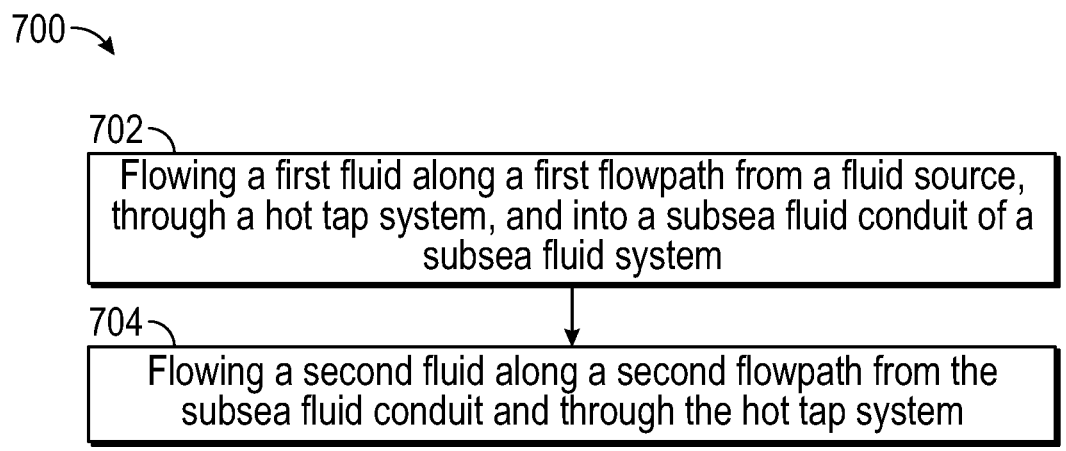
FIG. 33 is a flow chart illustrating an embodiment of a method for remediating a blockage in a subsea component in accordance with principles disclosed herein.

Referring to FIG. 33, an embodiment of a method 700 for remediating a blockage in a subsea component is shown. At block 702 of method 700, a first fluid is flowed along a first flowpath from a fluid source, through a hot tap system, and into a subsea fluid conduit of a subsea fluid system, wherein the hot tap system is coupled to an outer surface of the fluid conduit. In some embodiments, block 702 comprises flowing the first fluid along the first flowpath through a first coil tubing from a surface system. For instance, block 702 may comprise pumping hydrate inhibitor fluid along injection flowpath 250 through first coil tubing 104 and the fluid passage of hot tap 205 into jumper 50. In certain embodiments, block 702 of method 700 comprises circulating fluid along injection flowpath 361 through second coil tubing 130 and second hot tap 205B into jumper 50.

At block 704 of method 700, a second fluid is flowed along a second flowpath from the subsea fluid conduit and through the hot tap system, wherein the second flowpath is separate from the first flowpath. In some embodiments, block 704 of method 700 comprises flowing the second fluid along the second flowpath through the hot tap system and to the surface system. For instance, block 704 may comprise flowing oil from subsea fluid system 30 along return flowpath 252 through second coil tubing 130. In certain embodiments, block 704 of method 700 comprises circulating fluid along return flowpath 363 through first hot tap 205A and first coil tubing 104.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for remediating a blockage in a subsea fluid system, the system comprising:
   a hot tap system connected to an outer surface of a subsea fluid conduit of the subsea fluid system at a first position along the fluid conduit;
   a first flowpath extending from a fluid source, through a first coil tubing and a first port of the hot tap system, and into the subsea fluid conduit at the first position along the subsea fluid conduit; and
   a second flowpath existing concurrently with the first flowpath and extending from the subsea fluid conduit at the first position along the subsea fluid conduit; and through a second port of the hot tap system that is separate from the first port, wherein the second flowpath is separate from the first flowpath;
   wherein the hot tap system is configured to inject a first fluid into the subsea fluid conduit along the first flowpath and to simultaneously receive a second fluid from the subsea fluid conduit along the second flowpath.

2. The system of claim 1, further comprising a surface system disposed on a surface vessel and including a first coil tubing and a second coil tubing, wherein each coil tubing is extendable from the surface vessel, wherein the first coiled tubing and the second coiled tubing are each connected to the hot tap system.

3. The system of claim 2, wherein:
   the hot tap system comprises a first hot tap in fluid communication with the first coil tubing and a second hot tap that is entirely spaced from the first hot tap and in fluid communication with the second coil tubing; and
   the first hot tap is connected to a first end of the subsea fluid conduit and the second hot tap is connected to a second end of the subsea fluid conduit that is opposite the first end.

4. The system of claim 2, further comprising:
   a first subsea manifold comprising a first fluid passage and a second fluid passage that is separate from the first fluid passage, wherein the first coil tubing is connectable to the first fluid passage and the second coil tubing is connectable to the second fluid passage;
   a first jumper connectable to the first fluid passage of the first subsea manifold and the hot tap system; and
   a second jumper connectable to the second fluid passage of the first subsea manifold and the hot tap system.

5. The system of claim 4, wherein the first subsea manifold comprises a crossover fluid passage extending between the first fluid passage and the second fluid passage.

6. The system of claim 4, further comprising a second subsea manifold comprising a third fluid passage and a fourth fluid passage that is separate from the third fluid passage, wherein the first coil tubing is connectable to the third fluid passage and the second coil tubing is connectable to the fourth fluid passage.

7. The system of claim 4, wherein the first jumper connects to the first fluid passage with a first hot stab connector and the second jumper connects to the second fluid passage with a second hot stab connector.

8. The system of claim 4, further comprising:
   a third jumper connected between an end of the first coil tubing and the first fluid passage of the subsea manifold; and
   a fourth jumper connected between an end of the second coil tubing and the second fluid passage of the subsea manifold.

9. The system of claim 2, wherein the first coil tubing is configured to inject the first fluid into the fluid conduit along the first flowpath and the second coil tubing is configured to transport the second fluid received from the subsea fluid conduit along the second flowpath.

10. The system of claim 1, wherein the first fluid comprises a saturated brine solution and the second fluid comprises oil.

11. A system for remediating a blockage in a subsea fluid system, the system comprising:
    a fluid connection system coupled to an outer surface of a subsea fluid conduit of the subsea fluid system at a first position along the subsea fluid conduit; and
    a surface system disposed on a surface vessel and including a first coil tubing and a second coil tubing, wherein each coil tubing extends from the surface vessel to the fluid connection system whereby the first coil tubing and the second coil tubing are connected concurrently to the fluid connection system;
    wherein the first coil tubing is configured to inject a first fluid into the subsea fluid conduit along a first flowpath that extends through the first coil tubing and into the subsea fluid conduit at the first position along the subsea fluid conduit, and the second coil tubing is configured to, simultaneously with the injection of the first fluid into the subsea fluid conduit along the first flowpath, transport a second fluid received from the subsea fluid conduit along a second flowpath that extends from the subsea fluid conduit at the first position and through the second coil tubing, wherein the second flowpath is entirely separate from the first flowpath.

12. The system of claim 11, wherein the first flowpath extends through a first passage in the fluid connection system and the second flowpath extends through a second passage in the fluid connection system that is separate from the first flowpath.

13. The system of claim 12, wherein the fluid connection system comprises a first hot tap including the first passage and a second hot tap including the second passage.

14. The system of claim 11, wherein the surface system comprises an injection pump connected to the first coil tubing and configured to pump a hydrate inhibitor fluid into the fluid conduit of the subsea fluid system.

15. The system of claim 11, further comprising:
    a first subsea manifold comprising a first fluid passage and a second fluid passage that is separate from the first fluid passage, wherein the first coil tubing is connected to the first fluid passage and the second coil tubing is connected to the second fluid passage;
    a first jumper connected to the first fluid passage of the first subsea manifold and the fluid connection system; and
    a second jumper connected to the second fluid passage of the first subsea manifold and the fluid connection system;
    wherein the first flowpath extends through the first fluid passage of the first subsea manifold and the first jumper, and the second flowpath extends through the second fluid passage of the first subsea manifold and the second jumper.

16. The system of claim 15, further comprising a second subsea manifold comprising a third fluid passage and a fourth fluid passage that is separate from the third fluid passage, wherein the first coil tubing is connectable to the third fluid passage and the second coil tubing is connectable to the fourth fluid passage.

17. The system of claim 11, wherein the fluid connection system comprises a hot tap system.

18. A method for remediating a blockage in a subsea a subsea fluid system, comprising:
   (a) flowing a first fluid along a first flowpath from a fluid source, through a hot tap system, and into a subsea fluid conduit of the subsea fluid system at a first position along the subsea fluid conduit, wherein the hot tap system is coupled to an outer surface of the fluid conduit at the first position along the subsea fluid conduit; and
   (b) flowing simultaneously with the flowing of the first fluid along the first flowpath a second fluid along a second flowpath from the subsea fluid conduit at the first position along the subsea fluid conduit and through the hot tap system, wherein the second flowpath is separate from the first flowpath.

19. The method of claim 18, wherein (a) comprises pumping a hydrate inhibitor fluid along the first flowpath, the first flowpath extending from a surface system and through a first coil tubing, and (b) comprises depressurizing the fluid conduit of the subsea fluid system, the second flowpath extending through a second coil tubing.

20. The method of claim 18, further comprising:
   (c) flowing the first fluid through a production riser connected from the subsea fluid system.

21. The method of claim 18, wherein (a) comprises flowing the first fluid through a first fluid passage formed in the hot tap system, and (b) comprises flowing the second fluid through a second fluid passage formed in the hot tap system that is separate from the first fluid passage.

22. The method of claim 18, wherein (a) comprises flowing the first fluid through a first hot tap of the hot tap system, and (b) comprises flowing the second fluid through a second hot tap of the hot tap system that is entirely spaced from the first hot tap.

* * * * *